(12) United States Patent
Cook, III et al.

(10) Patent No.: US 10,029,305 B2
(45) Date of Patent: Jul. 24, 2018

(54) SEGREGATED MULTI-MATERIAL METAL-MATRIX COMPOSITE TOOLS

(71) Applicant: Halliburton Energy Services, Inc., Houston, TX (US)

(72) Inventors: Grant O. Cook, III, Spring, TX (US); Venkkateesh Parthasarathi Padmarekha, Conroe, TX (US); Yi Pan, Conroe, TX (US); Daniel Brendan Voglewede, Spring, TX (US); Garrett T. Olsen, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 271 days.

(21) Appl. No.: 14/905,305

(22) PCT Filed: Mar. 19, 2015

(86) PCT No.: PCT/US2015/021555
§ 371 (c)(1),
(2) Date: Jan. 15, 2016

(87) PCT Pub. No.: WO2016/148725
PCT Pub. Date: Sep. 22, 2016

(65) Prior Publication Data
US 2017/0106438 A1    Apr. 20, 2017

(51) Int. Cl.
*B22D 19/14* (2006.01)
*B22D 25/02* (2006.01)
(Continued)

(52) U.S. Cl.
CPC .............. *B22D 19/14* (2013.01); *B22D 25/02* (2013.01); *E21B 10/42* (2013.01); *B22F 3/1055* (2013.01);
(Continued)

(58) Field of Classification Search
CPC ........ B22D 19/02; B22D 19/14; B22D 25/02; B22C 9/22
(Continued)

(56) References Cited

U.S. PATENT DOCUMENTS

| 4,721,598 A | 1/1988 | Lee |
| 7,398,840 B2 | 7/2008 | Ladi et al. |

(Continued)

FOREIGN PATENT DOCUMENTS

| CA | 2539525 A1 | 10/2006 |
| GB | 2471823 A | 1/2011 |

(Continued)

OTHER PUBLICATIONS

International Search Report and Written Opinion for PCT/US2015/021555 dated Dec. 11, 2015.

*Primary Examiner* — Kevin P Kerns
(74) *Attorney, Agent, or Firm* — McDermott Will & Emery LLP

(57) ABSTRACT

A method for fabricating an infiltrated metal-matrix composite (MMC) tool includes positioning at least one boundary form within an infiltration chamber of a mold assembly and thereby segregating the infiltration chamber into at least a first zone and a second zone. Reinforcement materials are deposited into the infiltration chamber and include a first composition loaded into the first zone and a second composition loaded into the second zone. The first and second compositions are then infiltrated with at least one binder material to provide the infiltrated MMC tool with differing mechanical, chemical, physical, thermal, atomic, magnetic, or electrical properties between the first and second zones.

21 Claims, 10 Drawing Sheets

(51) Int. Cl.
*E21B 10/42* (2006.01)
*B22F 3/105* (2006.01)
*B22F 5/00* (2006.01)
*B23K 15/00* (2006.01)
*B23K 26/342* (2014.01)
*B33Y 10/00* (2015.01)
*B33Y 80/00* (2015.01)

(52) U.S. Cl.
CPC ........... *B22F 5/007* (2013.01); *B23K 15/0086* (2013.01); *B23K 26/342* (2015.10); *B33Y 10/00* (2014.12); *B33Y 80/00* (2014.12)

(58) Field of Classification Search
USPC .................... 164/91, 97, 271, 332, 333, 334
See application file for complete search history.

(56) References Cited

U.S. PATENT DOCUMENTS

| | | |
|---|---|---|
| 7,878,275 B2 | 2/2011 | Lockwood et al. |
| 8,109,177 B2 | 2/2012 | Kembaiyan |
| 8,347,990 B2 | 1/2013 | Lockwood et al. |
| 2004/0244540 A1 | 12/2004 | Oldham et al. |
| 2012/0298323 A1 | 11/2012 | Thomas et al. |
| 2013/0320598 A1 | 12/2013 | Atkins et al. |

FOREIGN PATENT DOCUMENTS

| | | | |
|---|---|---|---|
| GB | 2494810 | A | 3/2013 |
| WO | 2009140123 | A2 | 11/2009 |
| WO | 2013180695 | A1 | 12/2013 |

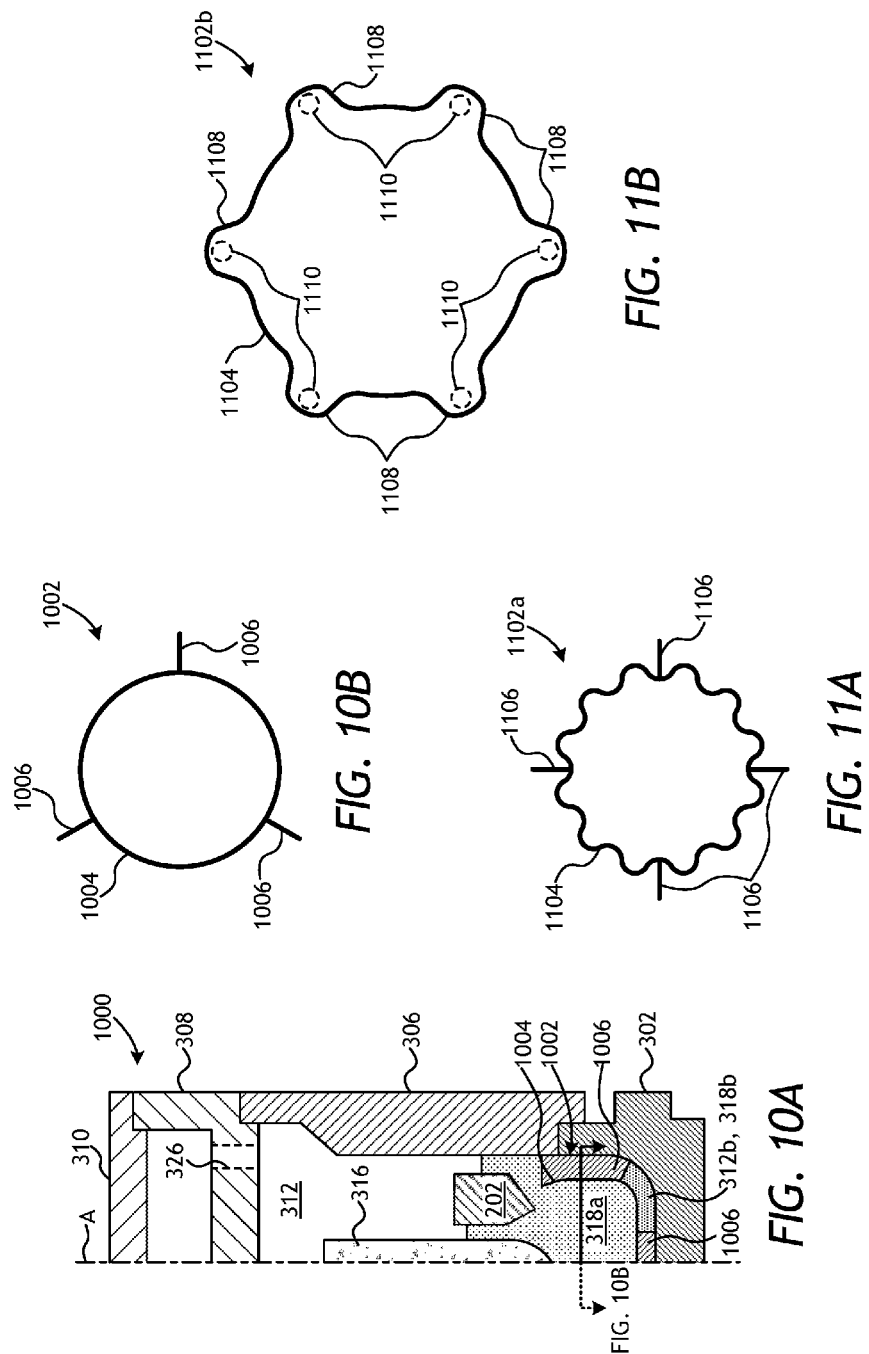

SEGREGATED MULTI-MATERIAL METAL-MATRIX COMPOSITE TOOLS

BACKGROUND

A wide variety of tools are commonly used in the oil and gas industry for forming wellbores, in completing wellbores that have been drilled, and in producing hydrocarbons such as oil and gas from completed wells. Examples of such tools include cutting tools, such as drill bits, reamers, stabilizers, and coring bits; drilling tools, such as rotary steerable devices and mud motors; and other downhole tools, such as window mills, packers, tool joints, and other wear-prone tools. These tools, and several other types of tools outside the realm of the oil and gas industry, are often formed as metal-matrix composites (MMCs), and referred to herein as "MMC tools."

An MMC tool is typically manufactured by placing loose powder reinforcing material into a mold and infiltrating the powder material with a binder material, such as a metallic alloy. The various features of the resulting MMC tool may be provided by shaping the mold cavity and/or by positioning temporary displacement materials within interior portions of the mold cavity. A quantity of the reinforcement material may then be placed within the mold cavity with a quantity of the binder material. The mold is then placed within a furnace and the temperature of the mold is increased to a desired temperature to allow the binder (e.g., metallic alloy) to liquefy and infiltrate the matrix reinforcement material.

MMC tools are generally erosion-resistant and exhibit high impact strength. The outer surfaces of MMC tools are commonly required to operate in extreme conditions. As a result, it may prove advantageous to customize the material properties of the outer surfaces of MMC tools to extend the operating life of a given MMC tool.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 10A and 10B depict another exemplary mold assembly that includes another exemplary boundary form.

FIGS. 11A and 11B depict cross-sectional top views of exemplary boundary forms that may be used in any of the mold assemblies described herein.

DETAILED DESCRIPTION

The present disclosure relates to tool manufacturing and, more particularly, to metal-matrix composite tools fabricated using boundary forms within the infiltration chamber to segregate regions of macroscopically different properties and associated methods of production and use related thereto.

The embodiments described herein may be used to fabricate infiltrated metal-matrix composite tools with at least two zones of macroscopically different properties. This can be accomplished via the use of one or more boundary forms positioned within an infiltration chamber to accommodate at least two types of reinforcement materials and/or binder materials. This may prove advantageous in allowing one to selectively place specific reinforcement materials in the infiltrated metal-matrix composite tool that exhibit differing macroscopic properties, which may result in the infiltrated metal-matrix composite tool achieving higher stiffness and/or erosion resistance at desired localized regions. In one example, for instance, an erosion-resistant or high-performance material may be selectively placed at the outer surfaces of the infiltrated metal-matrix composite tool, while the interior of the infiltrated metal-matrix composite tool could be made of a material that is tougher and of a lower-cost.

The embodiments of the present disclosure are applicable to any tool or device formed as a metal-matrix composite (MMC). Such tools or devices are referred to herein as "MMC tools" and may or may not be used in the oil and gas industry. For purposes of explanation and description only, however, the following description is related to MMC tools used in the oil and gas industry, such as drill bits, but it will be appreciated that the principles of the present disclosure are equally applicable to any type of MMC used in any industry or field, such as armor plating, automotive components (e.g., sleeves, cylinder liners, driveshafts, exhaust valves, brake rotors), bicycle frames, brake fins, aerospace components (e.g., landing-gear components, structural tubes, struts, shafts, links, ducts, waveguides, guide vanes, rotor-blade sleeves, ventral fins, actuators, exhaust structures, cases, frames), and turbopump components, without departing from the scope of the disclosure.

Figure 1:
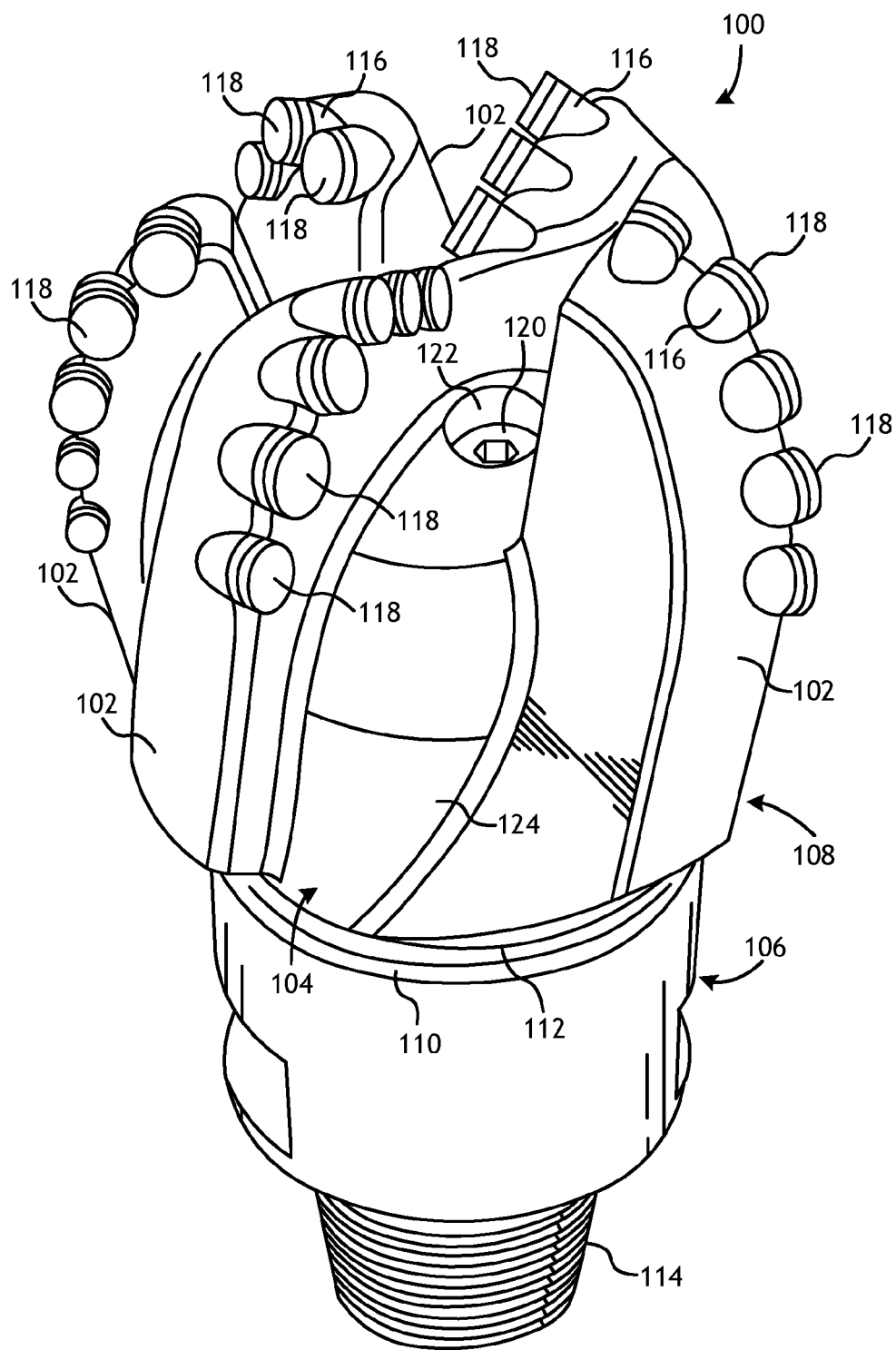
FIG. 1 is a perspective view of an exemplary drill bit that may be fabricated in accordance with the principles of the present disclosure.

Referring to FIG. 1, illustrated is a perspective view of an example MMC tool 100 that may be fabricated in accordance with the principles of the present disclosure. The MMC tool 100 is generally depicted in FIG. 1 as a fixed-cutter drill bit that may be used in the oil and gas industry to drill wellbores. Accordingly, the MMC tool 100 will be referred to herein as the "drill bit 100," but, as indicated above, the drill bit 100 may alternatively be replaced with any type of MMC tool or device used in the oil and gas industry or any other industry, without departing from the scope of the disclosure. Suitable MMC tools used in the oil and gas industry that may be manufactured in accordance with the teachings of the present disclosure include, but are not limited to, oilfield drill bits or cutting tools (e.g., fixed-angle drill bits, roller-cone drill bits, coring drill bits, bi-center drill bits, impregnated drill bits, reamers, stabilizers, hole openers, cutters), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, side-wall coring tools, fishing spears, washover tools, rotors, stators and/or housings for downhole drilling motors, blades and housings for downhole turbines, and other downhole tools having complex configurations and/or asymmetric geometries associated with forming a wellbore.

As illustrated in FIG. 1, the drill bit 100 may include or otherwise define a plurality of blades 102 arranged along the circumference of a bit head 104. The bit head 104 is connected to a shank 106 to form a bit body 108. The shank 106 may be connected to the bit head 104 by welding, such as using laser arc welding that results in the formation of a weld 110 around a weld groove 112. The shank 106 may further include or otherwise be connected to a threaded pin 114, such as an American Petroleum Institute (API) drill pipe thread.

In the depicted example, the drill bit 100 includes five blades 102, in which multiple recesses or pockets 116 are formed. Cutting elements 118 may be fixedly installed within each recess 116. This can be done, for example, by brazing each cutting element 118 into a corresponding recess 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 2:
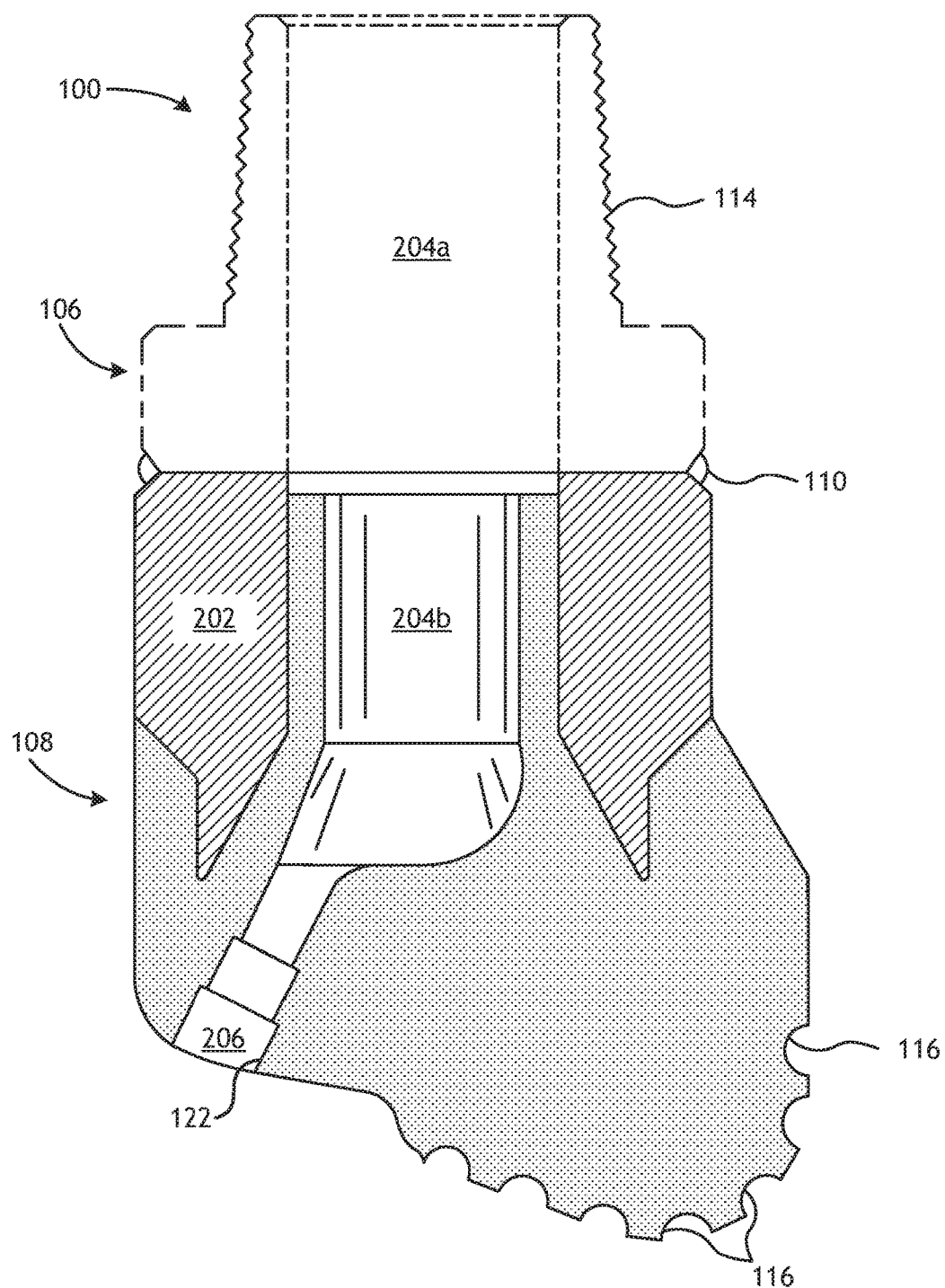
FIG. 2 is a cross-sectional view of the drill bit of FIG. 1.

FIG. 2 is a cross-sectional side view of the drill bit 100 of FIG. 1. Similar numerals from FIG. 1 that are used in FIG. 2 refer to similar components that are not described again. As illustrated, the shank 106 may be securely attached to a metal blank or mandrel 202 at the weld 110 and the mandrel 202 extends into the bit body 108. The shank 106 and the mandrel 202 are generally cylindrical structures that define corresponding fluid cavities 204a and 204b, respectively, in fluid communication with each other. The fluid cavity 204b of the mandrel 202 may further extend longitudinally into the bit body 108. At least one flow passageway 206 (one shown) may extend from the fluid cavity 204b to exterior portions of the bit body 108. The nozzle openings 122 (one shown in FIG. 2) may be defined at the ends of the flow passageways 206 at the exterior portions of the bit body 108. The pockets 116 are formed in the bit body 108 and are shaped or otherwise configured to receive the cutting elements 118 (FIG. 1).

Figure 3:
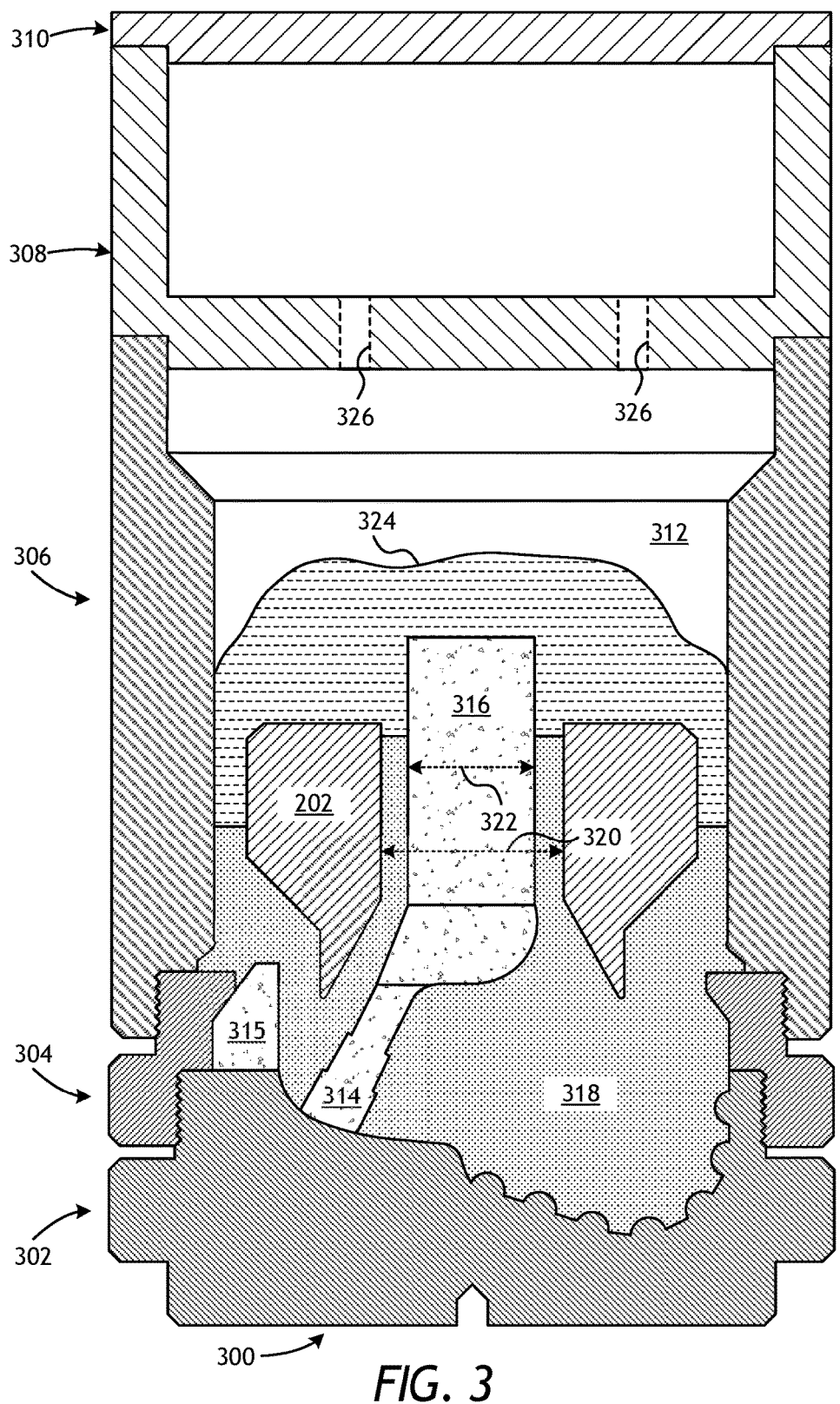
FIG. 3 is a cross-sectional side view of a mold assembly that may be used to fabricate the drill bit of FIGS. 1 and 2.

FIG. 3 is a cross-sectional side view of a mold assembly 300 that may be used to form the drill bit 100 of FIGS. 1 and 2. While the mold assembly 300 is shown and discussed as being used to help fabricate the drill bit 100, those skilled in the art will readily appreciate that variations of the mold assembly 300 may be used to help fabricate any of the infiltrated downhole tools mentioned above, without departing from the scope of the disclosure. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may instead be directly coupled to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components including, but not limited to, machining graphite blanks to produce the various components and thereby define the infiltration chamber 312 to exhibit a negative or reverse profile of desired exterior features of the drill bit 100 (FIGS. 1 and 2).

Materials, such as consolidated sand or graphite, may be positioned within the mold assembly 300 at desired locations to form various features of the drill bit 100 (FIGS. 1 and 2). For example, one or more nozzle displacements 314 (one shown) may be positioned to correspond with desired locations and configurations of the flow passageways 206 (FIG. 2) and their respective nozzle openings 122 (FIGS. 1 and 2). As will be appreciated, the number of nozzle displacements 314 extending from the central displacement 316 will depend upon the desired number of flow passageways and corresponding nozzle openings 122 in the drill bit 100. A cylindrically-shaped consolidated central displacement 316 may be placed on the legs 314. Moreover, one or more junk slot displacements 315 may also be positioned within the mold assembly 300 to correspond with the junk slots 124 (FIG. 1).

After the desired materials (e.g., the central displacement 316, the nozzle displacements 314, the junk slot displacement 315, etc.) have been installed within the mold assembly 300, reinforcement materials 318 may then be placed within or otherwise introduced into the mold assembly 300. The reinforcement materials 318 may include, for example, various types of reinforcing particles. Suitable reinforcing particles include, but are not limited to, particles of metals, metal alloys, superalloys, intermetallics, borides, carbides, nitrides, oxides, ceramics, diamonds, and the like, or any combination thereof.

Examples of suitable reinforcing particles include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HASTELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOY® alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof. In some embodiments, the reinforcing particles may be coated, such as diamond coated with titanium.

The mandrel 202 may be supported at least partially by the reinforcement materials 318 within the infiltration chamber 312. More particularly, after a sufficient volume of the reinforcement materials 318 has been added to the mold assembly 300, the mandrel 202 may then be placed within mold assembly 300. The mandrel 202 may include an inside diameter 320 that is greater than an outside diameter 322 of the central displacement 316, and various fixtures (not expressly shown) may be used to position the mandrel 202 within the mold assembly 300 at a desired location. The reinforcement materials 318 may then be filled to a desired level within the infiltration chamber 312.

Binder material 324 may then be placed on top of the reinforcement materials 318, the mandrel 202, and the central displacement 316. Suitable binder materials 324 include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Non-limiting examples of alloys of the binder material 324 may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Examples of commercially-available binder materials 324 include, but are not limited to, VIRGIN™ Binder 453D (copper-manganese-nickel-zinc, available from Belmont Metals, Inc.), and copper-tin-manganese-nickel and copper-tin-manganese-nickel-iron grades 516, 519, 523, 512, 518, and 520 available from ATI Firth Sterling; and any combination thereof.

In some embodiments, the binder material 324 may be covered with a flux layer (not expressly shown). The amount of binder material 324 (and optional flux material) added to the infiltration chamber 312 should be at least enough to infiltrate the reinforcement materials 318 during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300. The mold assembly 300 and the materials disposed therein may then be preheated and subsequently placed in a furnace (not shown). When the furnace temperature reaches the melting point of the binder material 324, the binder material 324 will liquefy and proceed to infiltrate the reinforcement materials 318.

After a predetermined amount of time allotted for the liquefied binder material 324 to infiltrate the reinforcement materials 318, the mold assembly 300 may then be removed from the furnace and cooled at a controlled rate. Once cooled, the mold assembly 300 may be broken away to expose the bit body 108 (FIGS. 1 and 2). Subsequent machining and post-processing according to well-known techniques may then be used to finish the drill bit 100 (FIG. 1).

According to embodiments of the present disclosure, the drill bit 100, or any of the MMC tools mentioned herein, may be fabricated with at least two regions of macroscopically different properties via the use of one or more boundary forms positioned in the infiltration chamber 312 before (or while) loading the reinforcement materials 318 and prior to infiltration. As described in greater detail below, such boundary forms may simplify the loading and infiltration processes and allow the infiltration chamber 312 to accommodate multiple types of reinforcement materials 318 and/or binder materials 324, which may result in segregated or separate infiltration, if desired. As will be appreciated, this may allow a user to selectively position specific reinforcement materials 318 in the bit body 108 (FIG. 2) that exhibit differing macroscopic properties, which may result in the bit body 108 achieving higher stiffness and/or erosion resistance at desired localized regions.

Figure 4A:
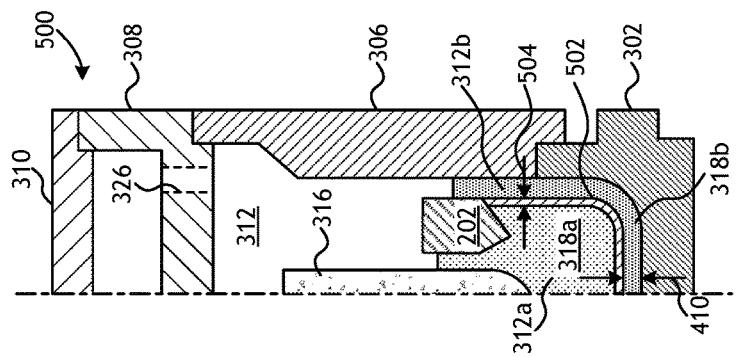
FIGS. 4A and 4B are cross-sectional side views of another exemplary mold assembly and include an exemplary boundary form.
Figure 4B:
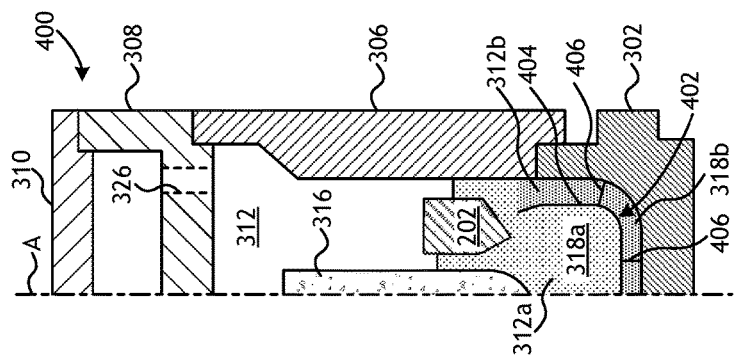

Referring now to FIGS. 4A and 4B, with continued reference to FIG. 3, illustrated is a partial cross-sectional side view of an exemplary mold assembly 400, according to one or more embodiments. For simplicity, only half of the mold assembly 400 is shown as taken along a longitudinal axis A of the mold assembly 400. It should be noted that the mold assemblies illustrated in successive figures (FIGS. 4-10, 12, 14, 16-17) are simplified approximations of the mold assembly 300 of FIG. 3 that allow for more simple schematics and straightforward explanations of the various embodiments. Furthermore, due to the asymmetric nature of straight-through cross sections for drill bits with an odd number of blades (FIGS. 1-3), successive cross-sectional figures are restricted to half sections to illustrate simplified generalized configurations that are applicable to drill bits of varying numbers of blades in addition to different portions of drill bits, such as blade sections (e.g., the right half of FIGS. 2-3) and junk-slot sections (e.g., the left half of FIGS. 2-3). It will be appreciated that embodiments illustrated in these half sections may be transferrable from blade regions to junk-slot regions by simply forming holes for positioning around the nozzle displacements 314 (FIG. 3).

The mold assembly 400 may be similar in some respects to the mold assembly 300 of FIG. 3 and therefore may be best understood with reference thereto, where like numerals represent like elements not described again in detail. Similar to the mold assembly 300, for instance, the mold assembly 400 may include the mold 302, the funnel 306, the binder bowl 308, and the cap 310. While not shown in FIGS. 4A and 4B, in some embodiments, the gauge ring 304 (FIG. 3) may also be included in the mold assembly 400. The mold assembly 400 may further include the mandrel 202, the central displacement 316, and one or more nozzle displacements or legs 314 (FIG. 3), as generally described above.

Unlike the mold assembly 300 of FIG. 3, however, the mold assembly 400 may further include at least one boundary form 402 that may be positioned within the infiltration chamber 312 before or while loading the reinforcement materials 318 (FIG. 3). The boundary form 402 may serve as a segregating partition that remains intact at least through the loading process of the reinforcement materials 318. In some embodiments, as illustrated, the boundary form 402 may include a body 404 and one or more standoffs or ribs 406 that extend from the body 404 toward an inner wall of the infiltration chamber 312. The ribs 406 may stabilize or support the body 404 within the infiltration chamber 312 and allow the body 404 to be generally offset or inset (i.e., radially and/or longitudinally) from the inner wall of the infiltration chamber 312 to an offset spacing 410. In some embodiments, the ribs 406 may support the boundary form 402 such that the offset spacing 410 is constant or consistent along all or a portion of the adjacent sections of the infiltration chamber 312. In other embodiments, however, the offset spacing 410 may vary about the inner wall of the infiltration chamber 312, especially at locations of the blades 102 (FIG. 1) and the junk slots 124 (FIG. 1).

In some embodiments, as illustrated, one or more of the ribs 406 may be rods, pins, posts, or other support members that extend from the body 404 toward the inner wall of the infiltration chamber 312. In other embodiments, as described in more detail below, one or more of the ribs 406 may alternatively comprise longitudinally and/or radially extending fins that extend from the body 404. In either case, the ribs 406 may either be formed as an integral part of the boundary form 402, or otherwise may be coupled to the body 404, such as via tack welds, an adhesive, one or more mechanical fasteners (e.g., screws, bolts, pins, snap rings, etc.), an interference fit, any combination thereof, and the like.

With the body 404 offset from the inner wall of the infiltration chamber 312 at the offset spacing 410, the infiltration chamber may be effectively segregated into at least two zones that may accommodate the loading of at least two different compositions of the reinforcement materials 318 (FIG. 3). More particularly, FIG. 4A depicts the mold assembly 400 prior to loading the reinforcement materials 318, and the boundary form 402 is shown as segregating the infiltration chamber 312 into at least a first zone 312a and a second zone 312b. The first zone 312a is located at the center or core of the infiltration chamber 312, and the second zone 312b is separated from the first zone 312a by the boundary form 402 and located adjacent the inner wall of the infiltration chamber 312.

FIG. 4B depicts the mold assembly 400 after loading the reinforcement materials 318 into the infiltration chamber 312, shown as a first composition 318a loaded into the first zone 312a and a second composition 318b loaded into the second zone 312b. Accordingly, the boundary form 402 may prove advantageous in facilitating segregated zones 312a,b that may be loaded with different compositions or types of reinforcement materials 318, which may result in the first and second zones 312a,b exhibiting different mechanical, chemical, physical, thermal, atomic, magnetic, or electrical properties following infiltration. For instance, the specific materials selected for the first composition 318a may result in the bit body 108 (FIGS. 1 and 2) having a ductile core following infiltration, while the specific materials selected for the second composition 318b may result in the bit body 108 having a stiff or hard outer shell following infiltration.

In some embodiments, to prevent collapse or deformation of the boundary form 402 during the loading process, the first and second compositions 318a,b may be loaded simultaneously. As will be appreciated, this may reduce unbalanced forces that may be exerted from opposing sides of the boundary form 402. Alternatively, it may be desired that the boundary form 402 undergo a certain amount of deflection during loading from one side, and thereby resulting in a curved or undulating boundary form 402 about the circumference of the body 404. In such embodiments, one of the first or second compositions 318a,b may be loaded into the infiltration chamber 312 first to allow the body 404 to bow outward and otherwise create an undulating circumferential surface, following which the other of the first or second compositions 318a,b may be loaded into the infiltration chamber 312. The resulting variable circumferential surface of the body 404 may prove advantageous in increasing the bonding surface area and pull-out strength between the segregated first and second zones 312a,b.

The degree of compaction of the first and second compositions 318a,b may be controlled in specific areas of the infiltration chamber 312 during the loading process. This may be accomplished by appropriately sequencing the loading process of one or both of the first and second compositions 318a,b. As will be appreciated, this may allow for better control of erosion and/or toughness in select locations of the bit body 108 (FIGS. 1 and 2). For example, the regions of the bit body 108 that provide the blades 102 (FIG. 1) can be subjected to a higher degree of compaction during loading to reduce inter-particle distance and improve resistance to erosion or deflection. However, the central or core regions of the bit body 108 may receive a reduced amount of compaction, or no compaction at all, to enhance the toughness properties at such locations. This could be achieved by loading the second zone 312b first and compacting the partially loaded mold assembly 400, and then loading the first zone 312a and compacting to a lesser extent (or not compacting) the fully loaded mold assembly 400.

In some embodiments, the boundary form 402 (i.e., the body 404) may comprise a solid structure, such as a rigid or semi-rigid foil or plate made of one or more materials. In such embodiments, the boundary form 402 may be an impermeable member that substantially prevents the first and second compositions 318a from intermixing during the loading and compaction processes. The thickness of the boundary form 402 (i.e., the body 404), and any of the boundary forms described herein, may depend on the application and/or the material used for the boundary form 402 and may vary across selective portions or locations of the boundary form 402. For instance, the thickness of the body 404 may depend on diffusion rates and melting points of particular materials used for the boundary form 402. A boundary form 402 made of copper, for example, could be as thin as about 0.03125 (1/32) inches and as thick as about 0.25 (1/4) inches. A boundary form 402 made of nickel, on the other hand, which exhibits a higher melting point and stiffness than copper, might be as thin as about 0.015625 (1/64) inches and as thick as about 0.125 (1/8) inches, without departing from the scope of the disclosure.

In other embodiments, the boundary form 402 may comprise a porous structure, such as a permeable or semi-permeable mesh, grate, or perforated plate that allows an amount of intermixing between the first and second compositions 318a,b during the loading process and compaction processes. In such embodiments, the body 404 may be fabricated from a plurality of intersecting elongate members (e.g., rods, bars, poles, etc.) that define a plurality of holes or cells. The body 404 may alternatively be fabricated from a foil or plate that is selectively perforated to create the plurality of holes or cells. The size of the holes in the body 404 may be designed to allow a certain level of mixing of the first and second compositions 318a,b on opposing sides of the boundary form 402 during loading. For example, the holes in the body 404 may be sized such that the boundary form 402 acts as a sieve that allows reinforcing particles of a predetermined size to traverse the boundary form 402, while preventing traversal of reinforcing particles greater than the predetermined size. During infiltration, the holes in the body 404 may further allow the binder material 324 (FIG. 3) to penetrate the boundary form 402 and infiltrate the first and second compositions 318a,b on either side of the boundary form 402. In at least one embodiment, the binder material 324 may penetrate the boundary form 402 to mix with a second binder material on the opposite side of the boundary form 402. In either case, the infiltration of a binder material 324 through the permeable or semi-permeable mesh, grate, or perforated plate may provide increased mechanical interlocking between the regions on either side of the boundary form 402, thereby helping to prevent the inner zone 312a from pulling out or twisting off the outer zone 312b during operation.

In yet other embodiments, the boundary form 402 may comprise one or more permeable portions and one or more impermeable portions, without departing from the scope of the disclosure. For instance, the body 404 may comprise one or more permeable portions configured to be positioned adjacent one or more corresponding junk slot 124 (FIG. 1) regions, and one or more impermeable portions configured to be positioned within one or more corresponding blade 102 (FIG. 1) regions.

The boundary form 402 may be made of a variety of materials, such as any of the materials listed herein for the reinforcement materials 318 (FIG. 3) and the binder material 324 (FIG. 3). Additional candidate materials for the boundary form 402 include refractory and stiff metals, such as beryllium, hafnium, iridium, niobium, osmium, rhenium, rhodium, ruthenium, tantalum, vanadium, and any combination or alloy thereof between these materials and those previously listed for the binder material 324. In some embodiments, all or a portion of the boundary form 402 may alternatively be made of a polymer or a foam (polymeric or metallic). Moreover, the boundary form 402 may comprise multiple materials. In such embodiments, the body 404 may comprise one or more types of materials, and the ribs 406 may comprise one or more different types of materials, such as a material that will dissolve in the binder material 324.

The selection of a particular material for fabricating the boundary form 402 may serve a variety of purposes. In some embodiments, for instance, the material for the boundary form 402 may be selected to become a permanent component of the MMC tool (e.g., the drill bit 100 of FIGS. 1 and 2) such that there is little or no erosion by diffusion into the binder material 324 (FIG. 3) during infiltration. In such embodiments, the material for the boundary form 402 may comprise tungsten, rhenium, osmium, or tantalum, for example, which may not be dissolvable in the binder material 324. The material for the boundary form 402 may alternatively be fabricated from a metal-matrix composite material or other similar composition to prevent the region occupied by the boundary form 402 from being devoid of strengthening particles.

In other embodiments, the material for the boundary form 402 may be selected to become a transient component of the MMC tool (e.g., the drill bit 100 of FIGS. 1 and 2) such that the material substantially or entirely dissolves into the binder material 324 during infiltration. In such embodiments, the material for the boundary form 402 may comprise copper or nickel, for example, which are generally dissolvable in the binder material 324. The boundary form 402 may alternatively be made of a mix of transient and permanent materials where, for example, the body 404 may comprise a non-dissolvable or permanent material and the ribs 406 may comprise a dissolvable or transient material. In such embodiments, the ribs 406 may comprise a material similar to the binder material 324 and would therefore dissolve into the binder material 324 during infiltration. An additional configuration may include a boundary form 402 composed of dissolvable inner and outer layers that contain reinforcing materials disposed between the layers. Such a configuration could allow for transport of the reinforcing particles through the dissolvable inner and outer layers to produce more even or uniform reinforcement between the inner and outer zones 312a,b and the boundary form 402.

In yet other embodiments, the material for the boundary form 402 may be selected to become a semi-permanent component of the MMC tool such that the material will undergo appreciable (but not total) diffusion into the binder material 324 during infiltration. In such embodiments, the material for the boundary form 402 may comprise a copper-niobium alloy, for example, which is semi-dissolvable in the binder material 324. As a result, a functional gradient may be produced, at least on one side of the boundary form 402 in applications where there are multiple binder materials 324. The body 404 of the boundary form 402 may alternatively comprise a first material coated with a second material that preferentially diffuses with the binder material 324 during infiltration. The second material may comprise, for example, nickel, which may diffuse into the binder material 324, but also add strength.

In even further embodiments, the boundary form 402 may be produced or manufactured using multiple materials, such as layered foils, coatings, or platings deposited on opposing sides of the boundary form 402 to facilitate certain key reactions in each zone 312a,b. In such embodiments, the body 404 of the boundary form 402 may be made of tungsten, for example, and coated with copper on one side facing the first zone 312a and coated with nickel on the opposing side facing the second zone 312b. The copper may diffuse into a first binder material that infiltrates the first zone 312a and thereby add ductility to the core of the MMC tool, while the nickel may diffuse into a second binder material that infiltrates the second zone 312b and thereby add strength or stiffness to the outer portions of the MMC tool. As the coatings diffuse or dissolve, the tungsten body 404 may become exposed, which may, in at least one embodiment, produce another key reaction with one or both of the first and second binder materials and result in promoted diffusion, localized strengthening, etc.

In one or more embodiments, any of the aforementioned materials and material compositions may be formed, machined, and otherwise manufactured into the desired shape and size for the boundary form 402. In at least one embodiment, all or a portion of the boundary form 402 may be manufactured via additive manufacturing, also known as "3D printing." Suitable additive manufacturing techniques that may be used to manufacture or "print" the boundary form 402 include, but are not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LMD)], fused deposition modeling (FDM), fused filament fabrication (FFF), selective laser sintering (SLS), stereolithography (SL or SLA), laminated object manufacturing (LOM), polyjet, any combination thereof, and the like. In such embodiments, the boundary form 402 may be printed using two or more selected materials.

In yet other embodiments, the boundary form 402 may be manufactured and otherwise formed from reinforcing particles or a binder material bonded or sintered together with minimal sintering aid or completely encapsulated in a ceramic or organic binder material. In such embodiments, the reinforcing particles may comprise any of the reinforcing particles mentioned herein with respect to the reinforcement materials 318 (FIG. 3) or any of the binder materials mentioned herein with respect to the binder material 324 (FIG. 3), or any combination thereof. During infiltration, the boundary form 402 may then become infiltrated by the binder material 324 (FIG. 3) and become a permanent part of the MMC tool (e.g., the drill bit 100 of FIG. 1) or provide interlocking between zones 312a,b.

Accordingly, the boundary form 402 may be configured to not only segregate the reinforcement materials 318 into at least the first and second zones 312a,b during loading, but may also be configured to provide reinforcement to the MMC tool (e.g., the drill bit 100 of FIG. 1) following infiltration. As will be appreciated, this may improve various mechanical, chemical, physical, thermal, atomic, magnetic, or electrical properties of the MMC tool, such as toughness and stiffness, depending on the application and the materials used. Moreover, the use of different types of reinforcing particles and/or binder material alloys in fabricating the boundary form 402 may influence the formation of localized residual stresses within the MMC tool. As will be appreciated, this may have a major influence on the mechanical performance of the MMC tool during operation. For instance, the resultant and/or net residual stress profile for the MMC tool can be tailored for the specific application by customizing location, type, and/or distribution of reinforcement material and/or binder material alloy. The localized stress fields within each zone 312a,b may also influence the overall failure mode of the MMC tool. As an example, the inner zone 312a or the boundary form 402 may contract sufficiently to cause a compressive stress in outer zone 312b. Consequently, by judicious selection of reinforcement material and/or binder material combinations, the performance of the MMC tool may be optimized.

Figure 5:
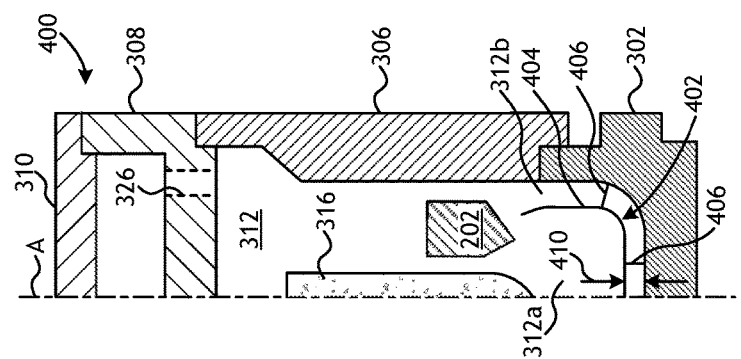
FIG. 5 is a cross-sectional side view of another exemplary mold assembly that includes another exemplary boundary form.

Referring now to FIG. 5, with continued reference to FIGS. 4A and 4B, illustrated is a partial cross-sectional side view of another exemplary mold assembly 500, according to one or more embodiments. The mold assembly 500 may be similar in some respects to the mold assembly 400 of FIGS. 4A and 4B and therefore may be best understood with reference thereto, where like numerals represent like elements that will not be described again. The mold assembly 500 may include a boundary form 502 that may be similar in some respects to the boundary form 402 of FIGS. 4A and 4B, such as being made of similar materials and fabricated via any of the aforementioned processes and methods. Unlike the boundary form 402, however, the boundary form 502 does not include the ribs 406. Rather, the boundary form 502 may be suspended within the infiltration chamber 312 to provide the offset spacing 410 and thereby define at least the first and second zones 312a,b configured to receive the first and second compositions 318a,b of the reinforcement materials 318 (FIG. 3).

In some embodiments, as illustrated, the boundary form 502 may be coupled to the mandrel 202 such as via tack welds, an adhesive, one or more mechanical fasteners (e.g., screws, bolts, pins, snap rings, etc.), an interference fit, any combination thereof, and the like. In other embodiments, however, the boundary form 502 may alternatively be coupled to a feature disposed above the mandrel 202, such as a centering fixture (not shown) used only during the loading process. Once the loading process is complete, and prior to the infiltration process, the centering fixture would be removed from the mold assembly 500. The geometry of the boundary form 502 may rise vertically to meet the outer diameter of the mandrel 202, as shown in FIG. 5, or it may be angled inwards (e.g., toward the longitudinal axis A), as shown in FIGS. 4A and 4B. In such cases, the boundary form 502 may coincide with the final back-bevel surface of the drill bit after finishing operations (e.g., FIG. 2). Note that FIG. 2 illustrates the cross-section of a finished drill bit, wherein some outer material of the mandrel 202 has been removed.

In the illustrated embodiment, the boundary form 502 may comprise an impermeable structure that substantially prevents the first and second compositions 318a from intermixing during the loading process. In other embodiments, however, the boundary form 502 may alternatively comprise a permeable structure, or a mixed permeable/impermeable structure, as described above. Moreover, the boundary form 502 may exhibit a thickness 504 that is greater than that of the boundary form 402 of FIGS. 4A and 4B. The thickness of the boundary form 502 may depend on the application and/or the particular material used to fabricate the boundary form 502. In some embodiments, the thickness 504 may vary across selective portions or locations of the boundary form 502 to coincide with selective regions of the bit body 108 (FIGS. 1 and 2).

Figure 6:
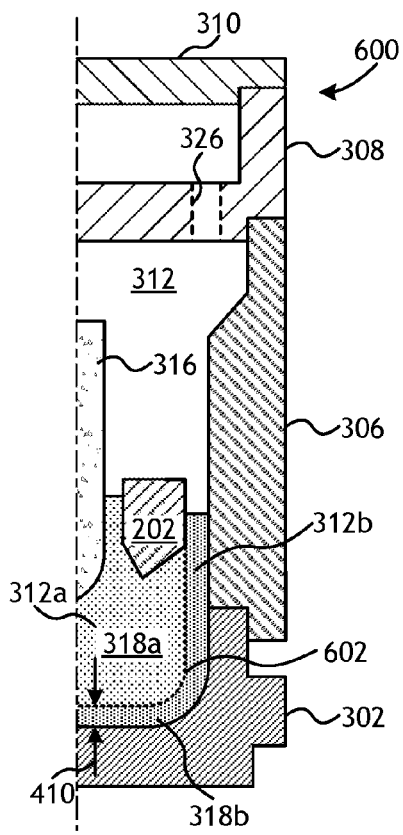
FIG. 6 is a cross-sectional side view of another exemplary mold assembly that includes another exemplary boundary form.

FIG. 6 is a partial cross-sectional side view of another exemplary mold assembly 600, according to one or more embodiments. The mold assembly 600 may also be similar in some respects to the mold assembly 400 of FIGS. 4A and 4B and therefore may be best understood with reference thereto, where like numerals represent like elements that will not be described again. The mold assembly 600 may include a boundary form 602 that may be similar in some respects to the boundary form 402 of FIGS. 4A-4B and the boundary form 502 of FIG. 5. Similar to the boundary form 502, for instance, the boundary form 602 may be suspended within the infiltration chamber 312 to provide the offset spacing 410 and thereby define at least the first and second zones 312a,b. In the illustrated embodiment, the boundary form 602 is depicted as being coupled to the mandrel 202, but could equally be suspended from other features, as discussed above.

Unlike the boundary form 502, however, the boundary form 602 may comprise a porous structure, such as a permeable or semi-permeable mesh, grate, or perforated plate that allows an amount of intermixing between the first and second compositions 318a,b during the loading and compaction processes. Moreover, in some embodiments, following the loading and compaction processes, the boundary form 602 may be detached from the mandrel 202 in preparation for the infiltration process. It will be appreciated, however, that the boundary form 502 of FIG. 5 may also be detached from the mandrel 202 in preparation for the infiltration process, and likewise any of the other boundary forms described herein that interact with the mandrel 202.

Figure 7A:
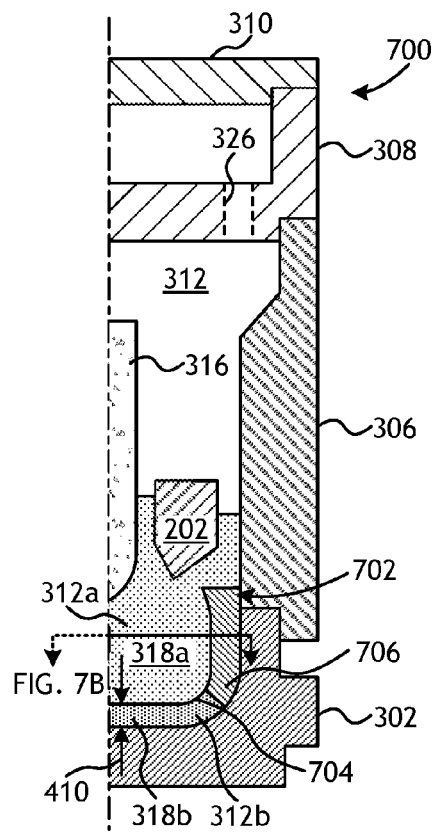
FIGS. 7A and 7B depict another exemplary mold assembly that includes another exemplary boundary form.
Figure 7B:
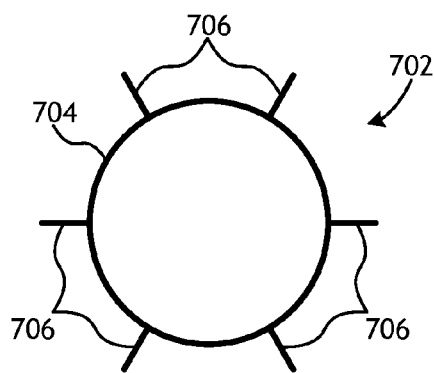

FIGS. 7A and 7B depict another exemplary mold assembly 700, according to one or more embodiments. More particularly, FIG. 7A illustrates a partial cross-sectional side view of the mold assembly 700, and FIG. 7B illustrates a cross-sectional top view of the mold assembly 700 as taken along the indicated lines in FIG. 7A. The mold assembly 700 may be similar in some respects to the mold assembly 400 of FIGS. 4A and 4B and therefore may be best understood with reference thereto, where like numerals represent like elements that will not be described again. The mold assembly 700 may include a boundary form 702 that may be similar in some respects to the boundary form 402 of FIGS. 4A and 4B. Similar to the boundary form 402, for instance, the boundary form 702 may include a body 704 and one or more ribs 706 that extend from the body 704 toward an inner wall of the infiltration chamber 312. The ribs 706 may stabilize or support the body 704 within the infiltration chamber 312 and allow the body 704 to be generally offset or inset (i.e., radially and/or longitudinally) from the inner wall of the infiltration chamber 312 by the offset spacing 410.

Unlike the boundary form 402, however, one or more of the ribs 706 of the boundary form 702 may comprise a vertically-disposed fin or plate that extends longitudinally along a portion of the body 704 toward the inner wall of the infiltration chamber 312. The ribs 706 may either be formed as an integral part of the boundary form 702, or otherwise may be coupled to the body 704, such as via tack welds, an adhesive, one or more mechanical fasteners (e.g., screws, bolts, pins, snap rings, etc.), an interference fit, any combination thereof, and the like. In the illustrated embodiment, the fin-shaped ribs 706 may extend longitudinally along the body 704 to an intermediate point.

As shown in FIG. 7B, the boundary form 702 may include a plurality of ribs 706 (six shown) extending radially from the body 704. Some of the ribs 706 may be fin-shaped, as described above, while others may be simple support members, such as rods, pins, or posts that extend toward the inner wall of the infiltration chamber 312. A potential embodiment for the cross-section shown in FIG. 7B could be a six-bladed bit wherein the six ribs correspond to either the six junk slots 124 (FIG. 1) or the six blades 102 (FIG. 1). As will be appreciated, more or less than six ribs 706 may be employed, without departing from the scope of the disclosure. Moreover, while the ribs 706 are depicted in FIG. 7B as being equidistantly spaced from each other about the circumference of the body 704, the ribs 706 may alternatively be spaced randomly from each other.

In the illustrated embodiment, the body 704 is depicted as exhibiting a generally circular cross-sectional shape. It will be appreciated, however, that the body 704 may alternatively exhibit various other cross-sectional shapes, such as oval, polygonal (e.g., triangular, square, pentagonal, hexagonal, etc.), elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices. In other embodiments, the cross-sectional shape of the body 704 may be modified to conform to the shape of the blades 102 (FIG. 1), for example, such as having a constant offset spacing from the outer surface of the MMC tool (e.g., the drill bit 100 of FIGS. 1 and 2). In such embodiments, the cross-sectional shape of the body 704 may be in the general shape of a gear, as described herein with reference to FIG. 11B.

In yet other embodiments, the cross-sectional shape of the body 704 may include patterned or varied undulations or other similar structures defined about its circumference. As will be appreciated, an undulating or variable outer circumference for the body 704 may prove advantageous in increasing surface area between the first and second zones 312a,b, and increasing the surface area may promote adhesion and enhance shearing strength between the macroscopic regions of the first and second zones 312a,b. Moreover, the variable outer circumference for the body 704 may prove advantageous in helping to prevent the second composition 318b from being torqued off from engagement with the first composition 318a following infiltration and during operational use of the MMC tool (e.g., the drill bit 100 of FIGS. 1 and 2).

Figure 8B:
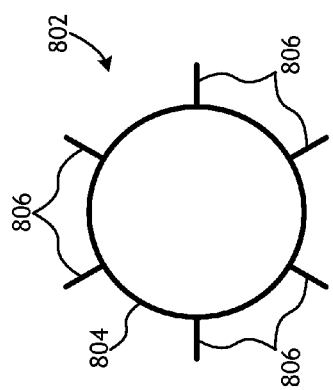
FIGS. 8A and 8B depict another exemplary mold assembly that includes another exemplary boundary form.
Figure 8A:
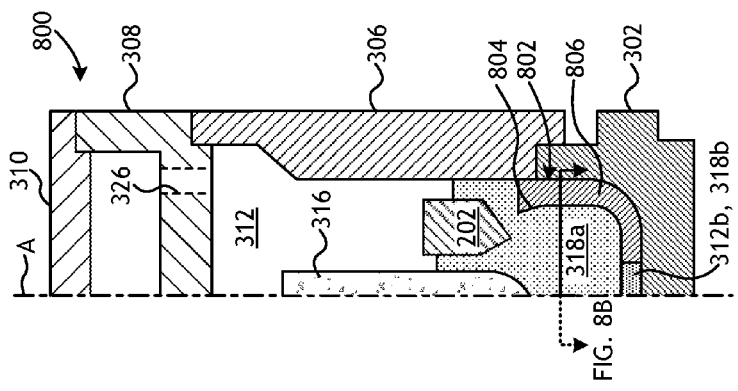

FIGS. 8A and 8B depict another exemplary mold assembly 800, according to one or more embodiments. FIG. 8A illustrates a partial cross-sectional side view of the mold assembly 800, and FIG. 8B illustrates a cross-sectional top view of the mold assembly 800 as taken along the indicated lines in FIG. 8A. The mold assembly 800 may be similar in some respects to the mold assembly 400 of FIGS. 4A and 4B and therefore may be best understood with reference thereto, where like numerals represent like elements not described again. The mold assembly 800 may include a boundary form 802 similar in some respects to the boundary form 702 of FIGS. 7A and 7B. Similar to the boundary form 702, for instance, the boundary form 802 may include a body 804 and one or more vertically disposed and fin-shaped ribs 806 that extend from the body 804 toward an inner wall of the infiltration chamber 312. The ribs 806 of the boundary form 802, however, may extend longitudinally along the body 804 almost to the longitudinal axis A.

As shown in FIG. 8B, the boundary form 802 may include six ribs 806 equidistantly spaced from each other about the circumference of the body 804. Some of the ribs 806 may be fin-shaped, as described above, while others may be simple support members, such as rods, pins, or posts that extend toward the inner wall of the infiltration chamber 312. As will be appreciated, more or less than six ribs 806 may be employed, without departing from the scope of the disclosure. Moreover, while the ribs 806 are depicted in FIG. 8B as being equidistantly spaced from each other about the circumference of the body 804, the ribs 806 may alternatively be spaced randomly from each other.

Figure 9A:
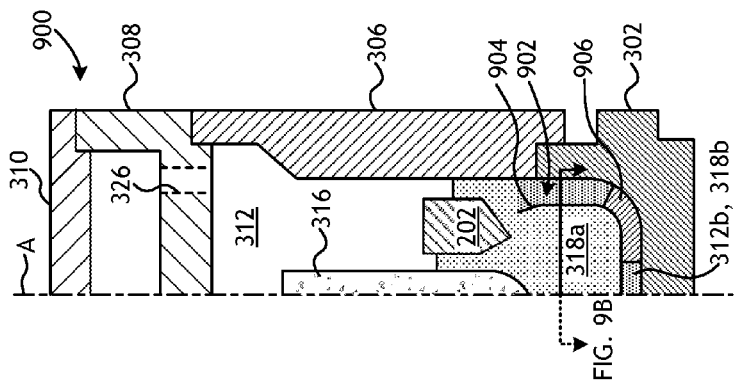
FIGS. 9A and 9B depict another exemplary mold assembly that includes another exemplary boundary form.
Figure 9B:
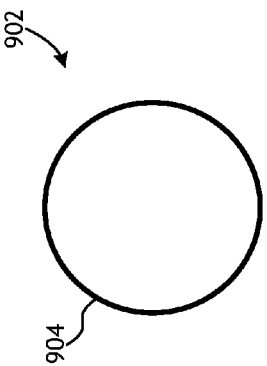

FIGS. 9A and 9B depict another exemplary mold assembly 900, according to one or more embodiments. FIG. 9A illustrates a partial cross-sectional side view of the mold assembly 900, and FIG. 9B illustrates a cross-sectional top view of the mold assembly 900 as taken along the indicated lines in FIG. 9A. The mold assembly 900 may be similar in some respects to the mold assembly 400 of FIGS. 4A and 4B and therefore may be best understood with reference thereto, where like numerals represent like elements not described again. The mold assembly 900 may include a boundary form 902 similar in some respects to the boundary form 802 of FIGS. 8A and 8B. Similar to the boundary form 802, for instance, the boundary form 902 may include a body 904 and one or more fin-shaped ribs 906 that extend from the body 904 toward an inner wall of the infiltration chamber 312. The ribs 906 of the boundary form 902, however, may extend longitudinally along the body 904 and otherwise be discretely located at or near the longitudinal axis A.

As shown in FIG. 9B, the body 904 is depicted as exhibiting a generally circular cross-sectional shape. It will be appreciated, however, that the body 904 may alternatively exhibit other cross-sectional shapes, such as oval, polygonal (e.g., triangular, square, pentagonal, hexagonal, etc.), elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices, and any combination thereof, without departing from the scope of the disclosure.

FIGS. 10A and 10B depict another exemplary mold assembly 1000, according to one or more embodiments. FIG. 10A illustrates a partial cross-sectional side view of the mold assembly 1000, and FIG. 10B illustrates a cross-sectional top view of the mold assembly 1000 as taken along the indicated lines in FIG. 9A. The mold assembly 1000 may be similar in some respects to the mold assembly 400 of FIGS. 4A and 4B and therefore may be best understood with reference thereto, where like numerals represent like elements not described again.

The mold assembly 1000 may include a boundary form 1002 similar in some respects to the boundary form 802 of FIGS. 8A and 8B. Similar to the boundary form 802, for instance, the boundary form 1002 may include a body 1004 and one or more fin-shaped ribs 1006 that extend from the body 1004 toward an inner wall of the infiltration chamber 312. The ribs 1006 of the boundary form 1002, however, may extend longitudinally along the body 1004 at discrete locations. For instance, some of the ribs 1006 may extend from the body 1004 and longitudinally along the inner wall of the infiltration chamber 312 to an intermediate point, and other ribs 1006 may be located at or near the longitudinal axis A. As shown in FIG. 10B, the boundary form 1002 may include three ribs 1006 that are equidistantly spaced from each other about the circumference of the body 1004, but could equally include more or less than three ribs 1006 that may alternatively be spaced randomly from each other, without departing from the scope of the disclosure. Various other ribs 1006 may be positioned at or near the longitudinal axis A (FIG. 10A).

FIGS. 11A and 11B depict cross-sectional top views of exemplary boundary forms 1102a and 1102b that may be used in any of the mold assemblies described herein. As illustrated, the boundary forms 1102a,b may each include a body 1104. In FIG. 11A, the body 1104 of the first boundary form 1102a may exhibit a cross-sectional shape that comprises undulations about its circumference. In other embodiments, the undulations may be squared off crenulations, without departing from the scope of the disclosure. Moreover, the first boundary form 1102a may include four ribs 1106 that are equidistantly spaced from each other about the circumference of the body 1104, but could equally include more or less than four ribs 1106 that may alternatively be spaced randomly from each other. The ribs 1106 may be fin-shaped or rod-like ribs, as generally described herein.

In FIG. 11B, the body 1104 of the second boundary form 1102b may exhibit a cross-sectional shape in the general form of a gear. More particularly, the body 1104 may provide or otherwise define a plurality of lobes 1108, and each lobe 1108 may be configured to be positioned within and otherwise correspond with a corresponding blade 102 (FIG. 1). In FIG. 11B, the ribs 1106 may be omitted or positioned at other locations as needed to help maintain the boundary form offset from the inner wall of the infiltration chamber 312 (FIG. 3). In other embodiments, or in addition to the undulating and/or gear-shaped body 1104, the boundary forms 1102a,b may further be roughened to provide additional adherence between the segregated zones 312a,b (FIGS. 4A-4B, 5, 6, 7A, 8A, 9A, and 10A).

In some embodiments, the second boundary form 1102b may further include one or more boundary sleeves or tubes 1110 positioned at select locations within the infiltration chamber. The boundary tubes 1110 may be made of any of the materials and via any of the process described herein with reference to any of the boundary forms. Accordingly, the boundary tubes 1110 may be permanent, semi-permanent, or transient members. Moreover, the boundary tubes 1110 may be used in conjunction with any of the boundary forms described herein, or independently. Accordingly, in at least one embodiment, body 1104 may be omitted from the second boundary form 1102b, and the boundary tubes 1110 may comprise the only component parts of the second boundary form 1102b.

In the illustrated embodiment, the boundary tubes 1110 are depicted as being placed within the lobes 1108, or the region where a corresponding blade 102 (FIG. 1) will subsequently be formed. The boundary tubes 1110 may extend longitudinally along all or a portion of the region for the blade 102 such that localized material changes can be made at those locations. Accordingly, the boundary tubes 1110 may prove advantageous in providing a segregating structure that allows a tougher region of reinforcement materials 318 (FIG. 3) to be loaded into the middle of the blade 102, while allowing a stiffer or harder reinforcement material 318 to be loaded and otherwise positioned on the outer surfaces of the blade 102.

While depicted in FIG. 11B as exhibiting a generally circular cross-sectional shape, the boundary tubes 1110 may alternatively exhibit a different cross-sectional shape, such as oval, elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices, and any combination thereof. As will be appreciated, the cross-sectional shape of the boundary tubes 1110 may depend, at least in part, on the geometrical design of the MMC tool. The boundary tubes 1110 may be characterized as branching members that result in an in situ "skeletal" frame of interior material with desired mechanical properties, like improved stiffness or higher material toughness.

Figure 12:
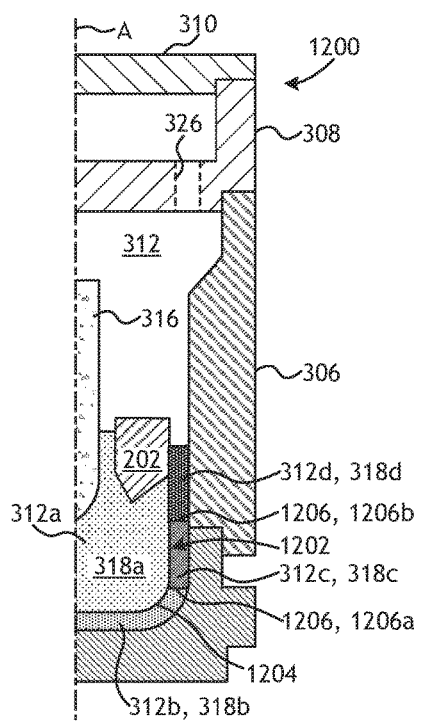
FIG. 12 is a cross-sectional side view of another exemplary mold assembly that includes another exemplary boundary form.

Referring now to FIG. 12, with continued reference to the prior figures, illustrated is a cross-sectional side view of another exemplary mold assembly 1200, according to one or more embodiments. The mold assembly 1200 may be similar in some respects to the mold assembly 400 of FIGS. 4A and 4B and therefore may be best understood with reference thereto, where like numerals represent like elements not described again. The mold assembly 1200 may include a boundary form 1202 that may be similar in some respects to the boundary form 502 of FIG. 5. In at least one embodiment, as illustrated, the boundary form 1202 may be suspended within the infiltration chamber 312, such as by being coupled to the mandrel 202 or another feature.

The boundary form 1202 may further include a body 1204 and one or more ribs 1206 (two shown as a first rib 1206a and a second rib 1206b) that extend from the body 1204 toward the inner wall of the infiltration chamber 312. The ribs 1206 may each comprise horizontally-disposed annular plates or fins that extend radially from the body 1204 at an angle substantially perpendicular to the longitudinal axis A. In the illustrated embodiment, the boundary form 1202 and the ribs 1206 may serve to segregate and otherwise separate the infiltration chamber 312 into a plurality of zones. More particularly, a first zone 312a is located at the center or core of the infiltration chamber 312, a second zone 312b is separated from the first zone 312a by the boundary form 1202 and located adjacent the inner wall of the infiltration chamber 312 at the bottom of the mold assembly 300, a third zone 312c is separated from the first and second zones 312a,b by the body 1204 and the first rib 1206a, and a fourth zone 312d is separated from the first and third zones 312a,c by the body 1204 and the second rib 1206b.

Accordingly, the first and second ribs 1206a,b may serve to separate or segregate the second, third, and fourth zones 312a-c along the longitudinal axis A. Moreover, it will be appreciated that there may be more than two ribs 1206a,b, without departing from the scope of the disclosure, and thereby resulting in more than four zones 312a-d. Moreover, in some embodiments, the ribs 1206a,b may extend from the boundary form 1202 at an angle offset from perpendicular to the longitudinal axis A, without departing from the scope of the disclosure.

In some embodiments, different types of reinforcement materials 318 (FIG. 3) may be deposited in each zone 312a-d to customize material properties along the longitudinal axis of the MMC tool (e.g., the drill bit 100 of FIGS. 1 and 2). In the illustrated embodiment, for example, the first composition 318a may be loaded into the first zone 312a, the second composition 318b may be loaded into the second zone 312b, a third composition 318c may be loaded into the third zone 312c, and a fourth composition 318d may be loaded into the fourth zone 312d. Accordingly, the boundary form 1202 may prove advantageous in facilitating segregated zones 312a-d that may be loaded with different types of reinforcement material compositions 318a-d, which may result in the various zones 312a-d exhibiting the same or different mechanical, chemical, physical, thermal, atomic, magnetic, or electrical properties along the longitudinal axis A following infiltration.

In some embodiments, the boundary form 1202 may comprise an impermeable structure that substantially prevents the compositions 318a-d from intermixing during the loading process. In such embodiments, the ribs 1206a,b may comprise separate component parts of the boundary form 1202 that may be sequentially installed during the loading and compaction processes. For example, the first rib 1206a may be installed in the infiltration chamber 312 after the second composition 318b is loaded into the second zone 312b. Similarly, the second rib 1206b may be installed in the infiltration chamber 312 after the third composition 318c is loaded into the third zone 312c.

In other embodiments, however, the boundary form 1202 may comprise a generally permeable structure, as described above. In such cases, the annular plate-like ribs 1206a,b may also be permeable and either be formed as an integral part of the boundary form 1202, or otherwise may be coupled to the body 1204 via tack welds, an adhesive, one or more mechanical fasteners (e.g., screws, bolts, pins, snap rings, etc.), an interference fit, any combination thereof, or the like. Moreover, in such embodiments, the holes or cells defined in the permeable ribs 1206a,b may be sized to allow a predetermined size of reinforcement particles to traverse the ribs 1206a,b to deposit the second and third compositions 312b,c in the second and third zones 312b,c, respectively. Accordingly, in at least one embodiment, the boundary form 1202 may operate as a sieve during the loading and compaction processes.

Figure 13A:
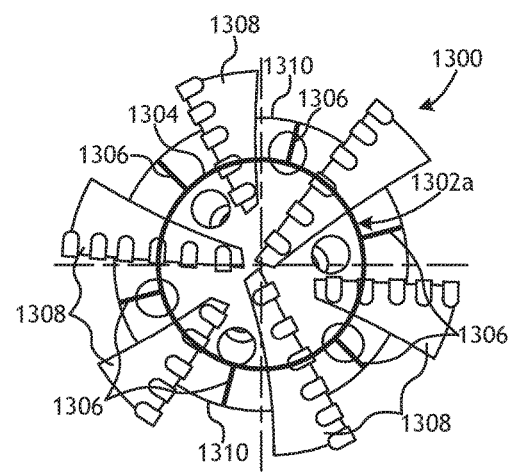
FIGS. 13A-13D are apex-end views of an exemplary drill bit having respective exemplary boundary forms schematically overlaid thereon.
Figure 13B:
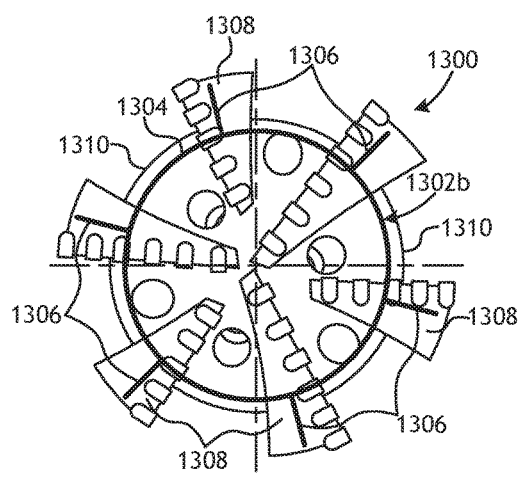
Figure 13C:
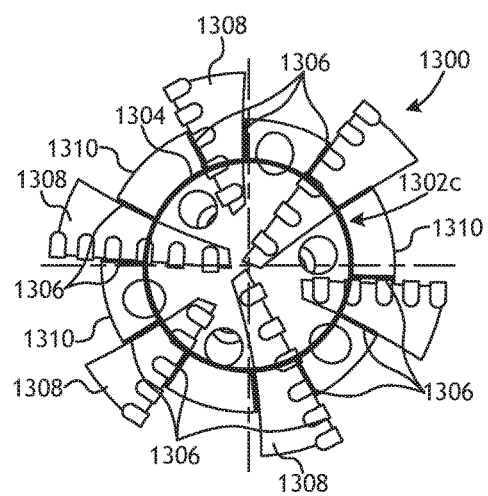
Figure 13D:
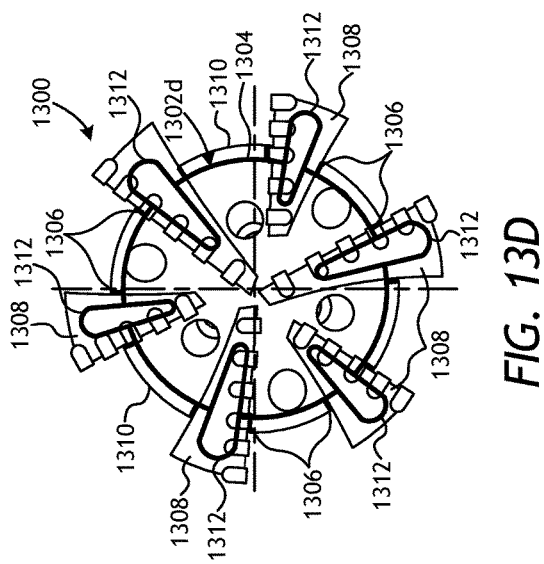

Referring now to FIGS. 13A-13D, illustrated are apex-end views of a drill bit 1300 having respective exemplary interior boundary form cross sections schematically overlaid thereon, according to one or more embodiments. More particularly, FIG. 13A depicts a first boundary form 1302a schematically overlaid on the drill bit 1300, FIG. 13B depicts a second boundary form 1302b schematically overlaid on the drill bit 1300, FIG. 13C depicts a third boundary form 1302c schematically overlaid on the drill bit 1300, and FIG. 13D depicts a fourth boundary form 1302d schematically overlaid on the drill bit 1300. As illustrated, each boundary form 1302a-d may include a body 1304 and one or more ribs 1306 that extend radially from the body 1304. Some of the ribs 1306 may be vertically-disposed fins, as described above, while others may be simple support members, such as rods, pins, or posts that extend toward the inner wall of the infiltration chamber 312 (FIG. 3) and provide support to the body 1304. The body 1304 of each boundary form 1302a-d is depicted as exhibiting a generally circular cross-sectional shape, but it will be appreciated that the body 1304 of any of the boundary forms 1302a-d may alternatively exhibit other cross-sectional shapes, such as elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices, without departing from the scope of the disclosure. Moreover, it will be appreciated that the cross-sectional shape of the body 1304 may vary along the height of the body 1304 and may otherwise include a plurality of the above cross-sectional shapes, in keeping with the present disclosure.

In FIG. 13A, the boundary form 1302a is depicted as having six ribs 1306 equally spaced between blades 1308 of the drill bit 1300. As illustrated, each rib 1306 may extend radially until reaching an exterior surface of a corresponding junk slot 1310, for example. In other embodiments, one or more of the ribs 1306 may extend from the body 1304 but stop short of the exterior surface of the junk slots 1310, without departing from the scope of the disclosure.

In FIG. 13B, the ribs 1306 of the second boundary form 1302b may extend from the body 1304 and protrude into the blades 1308. In some embodiments, one or more of the ribs 1306 may extend to touch an exterior surface of a corresponding one or more of the blades 1308. In other embodiments, however, the ribs 1306 may extend into the region of the blades without touching the exterior sides of the blades 1308, as illustrated. The second boundary form 1302b may use other ribs (not shown) in other key locations within the drill bit 1300, such as within the junk slots 1310, to minimize exposure of the boundary form 1302b to the outer surfaces of the blades 1308. As will be appreciated, positioning the ribs 1306 in the region of the blades 1308 may prove advantageous in providing structural enhancement of the drill bit 1300 within the blades 1308 following infiltration. In such cases, more than one rib 1306 may protrude into each blade 1308.

In FIG. 13C, the ribs 1306 of the third boundary form 1302c are depicted as substantially segregating the blades 1308 from the junk slots 1310 and the central portions of the drill bit 1300. In such embodiments, different compositions of the reinforcement materials 318 (FIG. 3) may be disposed in the blades 1308, the junk slots 1310, and the central portions of the drill bit 1300 to thereby selectively modify and optimize mechanical, chemical, physical, thermal, atomic, magnetic, or electrical properties in each segregated region. The reinforcement materials 318 selected for the blades 1308, for example, may result in a stiff, erosion-resistant material at the blades 1308 following infiltration. The reinforcement materials 318 selected for the junk slots 1310, however, may result in a stiff material with optimized surface characteristics following infiltration, and the reinforcement materials 318 selected for the central portions of the drill bit 1300 may result in a ductile and tough material that is resistant to crack formation and/or propagation following infiltration.

In FIG. 13D, similar to the boundary form 1302c, the ribs 1306 of the boundary form 1302d substantially segregate the blades 1308 from the junk slots 1310 and the central portions of the drill bit 1300. The boundary form 1302d, however, may further include separators 1312 positioned in each blade 1308. The separators 1312 may be column-like structures that segregate and otherwise separate the blades 1308 from other regions of the drill bit 1300. In some embodiments, as illustrated, the separators 1312 may exhibit an ovoid cross-sectional shape, but may alternatively exhibit any cross-sectional shape desired to fit a particular application. In the illustrated embodiment, different compositions of the reinforcement materials 318 (FIG. 3) may be disposed in the blades 1308, the junk slots 1310, and the central portions of the drill bit 1300 to thereby selectively modify and optimize mechanical, chemical, physical, thermal, atomic, magnetic, or electrical properties in each segregated region. For instance, the reinforcement materials 318 selected to be loaded into the separators 1312 may result in a stiff material at the blades 1308 following infiltration, while the reinforcement materials 318 selected to be loaded outside of the separators 1312 at the blades 1308 may result in a more erosion-resistant material. The reinforcement materials 318 selected for the junk slots 1310, may result in a stiff material with optimized surface characteristics (e.g., anti-balling) following infiltration, and the reinforcement materials 318 selected for the central portions of the drill bit 1300 may result in a ductile and tough material that is resistant to crack formation and/or propagation following infiltration. The reinforcement materials 318 selected for the central portions of the drill bit 1300 may also serve to interlock all the inner blade zones.

In any of the embodiments of FIGS. 13A-D, it will be appreciated that a single type of the binder material 324 (FIG. 3) may be used to infiltrate each of the zones segregated by the four boundary forms 1302a-d. In at least one embodiment, however, two or more types of the binder material 324 may be used to selectively infiltrate the segregated zones, without departing from the scope of the disclosure.

Moreover, in any of the embodiments of FIGS. 13A-D, it will be appreciated that horizontally-extending ribs may be included in any of the boundary forms 1302a-d, such as the ribs 1206a,b of the boundary form 1202 of FIG. 12. In such embodiments, a random or predetermined number of regions of arbitrary size and shape may be produced throughout the drill bit 1300. Embodiments could include one material composition along the whole height of the blade 1308 and three (vertical) material compositions along the height of the junk slots 1310. Another embodiment may be the opposite, wherein the junk slot 1310 comprises one material composition and the blade 1308 varies along its height. A third embodiment might include blades 1308 with vertical material compositions that vary parabolically in thickness [e.g., one inch for first depth (that closest to apex), two inches for second depth, four inches for third depth] independent of or in conjunction with varying compositions in the junk slot 1310. Those skilled in the art will readily recognize the several other embodiments and variations that may be achieved, without departing from the scope of this disclosure.

Figure 14:
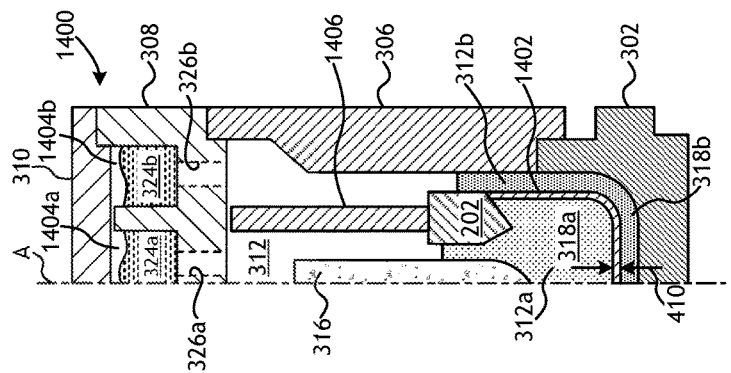
FIG. 14 is a cross-sectional side view of another exemplary mold assembly that includes another exemplary boundary form.

Referring now to FIG. 14, with continued reference to the prior figures, illustrated is a cross-sectional side view of another exemplary mold assembly 1400, according to one or more embodiments. The mold assembly 1400 may be similar in some respects to the mold assembly 400 of FIGS. 4A and 4B and therefore may be best understood with reference thereto, where like numerals represent like elements not described again. The mold assembly 1400 may include a boundary form 1402 that may be similar in some respects to the boundary form 502 of FIG. 5. In at least one embodiment, as illustrated, the boundary form 1402 may be suspended within the infiltration chamber 312, such as by being coupled to the mandrel 202 or another suitable feature. In other embodiments, however, the boundary form 1402 may alternatively (or in addition thereto) include one or more ribs (not shown) that support the boundary form 1402 within the infiltration chamber 312. As illustrated, the boundary form 1402 may be offset from the inner wall of the infiltration chamber by the offset spacing 410 and thereby define at least the first and second zones 312a,b configured to receive the first and second compositions 318a,b of the reinforcement materials 318 (FIG. 3).

In some embodiments, the boundary form 1402 may comprise an impermeable structure that substantially prevents the compositions 318a,b from intermixing during the loading and compaction processes. In other embodiments, however, the boundary form 1402 may comprise a permeable or semi-permeable structure, as described above, and therefore able to allow an amount of intermixing of the compositions 318a,b during the loading and compaction processes. In yet other embodiments, the boundary form 1402 may comprise portions that are permeable and other portions that are impermeable, without departing from the scope of the disclosure.

The bowl 308 in the mold assembly 1400 may be partitioned to define at least a first binder cavity 1404a and a second binder cavity 1404b. One or more first conduits 326a and one or more second conduits 326b may be defined through the bowl 308 to facilitate communication between the infiltration chamber 312 and the first and second binder cavities 1404a,b, respectively. In operation, a first binder material 324a may be positioned in the first binder cavity 1404a, and a second binder material 324b may be positioned in the second binder cavity 1404b. During the infiltration process, the first and second binder materials 324a,b may liquefy and flow into the first and second zones 312a,b via the first and second conduits 326a,b, respectively. Accordingly, the first binder material 324a may be configured to infiltrate the first composition 318a and the second binder material 324b may be configured to infiltrate the second composition 318b.

In some embodiments, an annular divider 1406 may be positioned in the infiltration chamber 312 to prevent the liquefied first and second binder materials 324*a,b* from intermixing prior to infiltrating the first and second compositions 318*a,b*, respectively. As illustrated in FIG. 14, the annular divider 1406 may rest on and otherwise extend from the mandrel 202 to divide the infiltration chamber 312. In some embodiments, instead of placing the binder materials 324*a,b* in the binder bowl 308, the binder materials 324*a,b* may instead be deposited in the infiltration chamber 312 on opposing sides of the annular divider 1406 and the infiltration process may proceed as described above.

The first and second binder materials 324*a,b* may comprise any of the materials listed herein as suitable for the binder material 324 of FIG. 3. In some embodiments, however, the first and second binder materials 324*a,b* may comprise different material compositions, which may result in the first and second zones 312*a,b* exhibiting different mechanical, chemical, physical, thermal, atomic, magnetic, or electrical properties following infiltration. For instance, the specific materials selected for the first composition 318*a* and the first binder material 324*a* may result in the bit body 108 (FIGS. 1 and 2) having a ductile core following infiltration, while the specific materials selected for the second composition 318*b* and the second binder material 324*b* may result in the bit body 108 having a stiff or hard outer shell following infiltration. In such embodiments, the first binder material 324*a* may exhibit a high copper concentration, which will result in higher ductility, while the second binder material 324*b* may exhibit a high nickel concentration, which will result in a more stiff composite material.

Figure 15A:
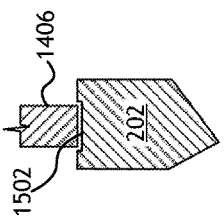
FIGS. 15A-15C depict various interface configurations between the annular divider and the mandrel of FIG. 14.
Figure 15B:
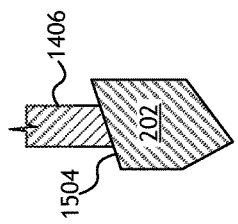
Figure 15C:
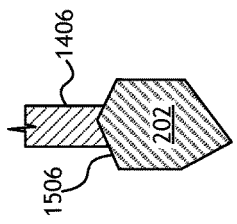

FIGS. 15A-15C depict various configurations of the interface between the annular divider 1406 and the mandrel 202 in dividing the infiltration chamber 312. In FIG. 15A, for instance, the mandrel 202 may define and otherwise provide a groove 1502 and an end of the annular divider 1406 may be received within the groove 1502. The groove 1502 may prove advantageous in preventing the annular divider 1406 from dislodging from engagement with the mandrel 202. The annular divider 1406 may rest within the groove or may alternatively be coupled thereto, such as by welding, adhesives, mechanical fasteners, an interference fit, or any combination thereof.

In FIG. 15B, the annular divider 1406 may be coupled to the mandrel 202, which may provide or otherwise define an angled upper surface 1504 that helps prevent the annular divider 1406 from translating laterally with respect to the mandrel 202 and separating therefrom during operation. The annular divider 1406 may be coupled to the angled upper surface 1504 via a tack weld, an adhesive, one or more mechanical fasteners (e.g., screws, bolts, pins, snap rings, etc.), any combination thereof, or the like. Coupling the annular divider 1406 to the mandrel 202 may prevent the annular divider 1406 from separating from the mandrel 202 during operation, and thereby ensuring that the infiltration chamber 312 remains divided.

In FIG. 15C, the annular divider 1406 may be positioned on a double-angled upper surface 1506 defined or otherwise provided by the mandrel 202. In some embodiments, the annular divider 1406 may rest on the double-angled upper surface 1506, which may provide a beveled seat that further helps prevent the annular divider 1406 from translating laterally with respect to the mandrel 202 and separating therefrom during operation. In other embodiments, however, the annular divider 1406 may be coupled to the double-angled upper surface 1506 via a tack weld, an adhesive, one or more mechanical fasteners (e.g., screws, bolts, pins, snap rings, etc.), any combination thereof, or the like.

Figure 16:
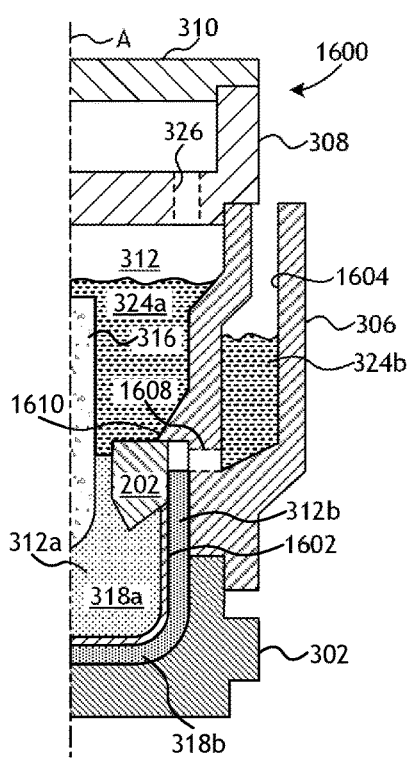
FIG. 16 is a cross-sectional side view of another exemplary mold assembly that includes another exemplary boundary form.

Referring now to FIG. 16, with continued reference to the prior figures, illustrated is a cross-sectional side view of another exemplary mold assembly 1600, according to one or more embodiments. The mold assembly 1600 may be similar in some respects to the mold assembly 400 of FIGS. 4A and 4B and therefore may be best understood with reference thereto, where like numerals represent like elements not described again. The mold assembly 1600 may include a boundary form 1602 similar to the boundary form 1402 of FIG. 14, which defines at least the first and second zones 312*a,b* that receive the first and second compositions 318*a,b* of the reinforcement materials 318 (FIG. 3).

The funnel 306 of the mold assembly 1600, however, may provide and otherwise define a funnel binder cavity 1604 configured to receive a second binder material 324*b*. One or more conduits 1608 may be defined in the funnel 306 to facilitate communication between the funnel binder cavity 1604 and the infiltration chamber 312 and, more particularly, between the funnel binder cavity 1604 and the second zone 312*b*. In operation, a first binder material 324*a* may be placed in the infiltration chamber 312 or otherwise in the binder bowl 308, and the second binder material 324*b* may be deposited in the funnel binder cavity 1604. During the infiltration process, the binder materials 324*a,b* may liquefy and flow into the infiltration chamber 312 and, more particularly, into the first and second zones 312*a,b*, respectively. The funnel 306 may further define a radial protrusion 1610 that extends into the infiltration chamber 312 and generally prevents the first binder material 324*a* from entering the second zone 312*b*. Accordingly, the first binder material 324*a* may be configured to infiltrate the first composition 318*a* and the second binder material 324*b* may be configured to infiltrate the second composition 318*b*.

The first and second binder materials 324*a,b* may comprise any of the materials listed herein as suitable for the binder material 324 of FIG. 3. In some embodiments, however, the binder materials 324*a,b* may comprise different material compositions, which may result in the first and second zones 312*a,b* exhibiting different mechanical, chemical, physical, thermal, atomic, magnetic, or electrical properties following infiltration. In such embodiments, the first and second compositions 318*a,b* may or may not comprise the same material compositions (e.g., reinforcing particles).

Figure 17:
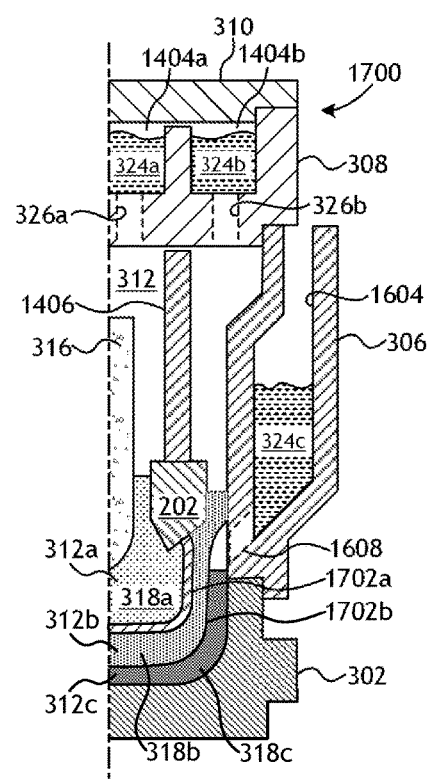
FIG. 17 is a cross-sectional side view of another exemplary mold assembly that includes another exemplary boundary form.

Referring now to FIG. 17, with continued reference to the prior figures, illustrated is a cross-sectional side view of another exemplary mold assembly 1700, according to one or more embodiments. The mold assembly 1700 may be similar in some respects to the mold assembly 400 of FIGS. 4A and 4B and therefore may be best understood with reference thereto, where like numerals represent like elements not described again. The mold assembly 1700 may also be similar in some respects to the mold assemblies 1400 and 1600 of FIGS. 14 and 16. Similar to the mold assembly 1400, for instance, the mold assembly 1700 may include the bowl 308 as partitioned to define at least the first and second binder cavities 1404*a,b* and corresponding first and second conduits 326*a,b* to facilitate communication between the infiltration chamber 312 and the first and second binder cavities 1404*a,b*, respectively. Moreover, the mold assembly 1700 may also include the annular divider 1406 to prevent the liquefied first and second binder materials 324*a,b* from intermixing prior to infiltrating the first and second compositions 318*a,b*, respectively. Similar to the mold assembly 1600, the mold assembly 1700 may further include the funnel 306 that defines the funnel binder cavity 1604 and the conduit(s) 1608 that facilitate communication between the funnel binder cavity 1604 and the infiltration chamber 312. The funnel binder cavity 1604 may be configured to receive a third binder material 324c.

Unlike the mold assemblies 1400 and 1600, however, the mold assembly 1700 may include a first boundary form 1702a and a second boundary form 1702b positioned within the infiltration chamber 312 and segregating the infiltration chamber 312 into at least a first zone 312a, a second zone 312b, and a third zone 312c. The first zone 312a is located at the center or core of the infiltration chamber 312, the second zone 312b is separated from the first zone 312a by the first boundary form 1702a, and the third zone 312c is separated from the second zone 312b by the second boundary form 1702b and located adjacent the inner wall of the infiltration chamber 312. Accordingly, the first and second boundary forms 1702a,b may be offset from each other within the infiltration chamber 312 in a type of nested relationship, and the second zone 312b may generally interpose the first and third zones 312a,c.

During the loading and compaction processes, a first composition 318a may be loaded into the first zone 312a, a second composition 318b may be loaded into the second zone 312b, and a third composition 318c may be loaded into the third zone 312c. Accordingly, the boundary forms 1702a,b may prove advantageous in facilitating segregated zones 312a-c that may be loaded with the same or different compositions or types of reinforcement materials 318 (FIG. 3), which may result in the first, second, and third zones 312a-c exhibiting different mechanical, chemical, physical, thermal, atomic, magnetic, or electrical properties following infiltration.

In at least one embodiment, as illustrated, the boundary forms 1702a,b may be suspended within the infiltration chamber 312, such as by being coupled to the mandrel 202 or a side wall of the infiltration chamber 312. In other embodiments, however, one or both of the boundary forms 1702a,b may alternatively (or in addition thereto) include one or more ribs (not shown) that support the boundary forms 1702a,b within the infiltration chamber 312. In some embodiments, one or both of the boundary forms 1702a,b may comprise impermeable structures that substantially prevent the compositions 318a-c from intermixing during the loading and compaction processes. In other embodiments, however, one or both of the boundary forms 1702a,b may comprise generally permeable structures, as described above, and therefore able to allow an amount of intermixing of the compositions 318a-c during the loading and compaction processes.

In operation, the first binder material 324a may be positioned in the first binder cavity 1404a, the second binder material 324b may be positioned in the second binder cavity 1404b, and the third binder material 324c may be positioned in the funnel binder cavity 1604. Alternatively, the first and second binder materials 324a,b may be placed within the infiltration chamber 312 on opposing sides of the annular divider 1406. During the infiltration process, the first and second binder materials 324a,b may liquefy and flow into the infiltration chamber 312 and, more particularly, into the first and second zones 312a,b, respectively. Moreover, the third binder material 324c may liquefy and flow into the third zone 312c via the conduit(s) 1608. Accordingly, the first binder material 324a may be configured to infiltrate the first composition 318a, the second binder material 324b may be configured to infiltrate the second composition 318b, and the third binder material 324c may be configured to infiltrate the third composition 318c.

The binder materials 324a-c may comprise any of the materials listed herein as suitable for the binder material 324 of FIG. 3. In some embodiments, however, one or more of the binder materials 324a-c may comprise different materials, which may result in the zones 312a-c exhibiting different mechanical, chemical, physical, thermal, atomic, magnetic, or electrical properties following infiltration. In such embodiments, one or more of the compositions 318a-c may be different from the others and otherwise not comprise the same type of reinforcing particles. Such an embodiment may prove advantageous in allowing an operator to selectively place specific materials at desired locations within and about the bit body 108 (FIGS. 1 and 2) and thereby obtain optimized mechanical, chemical, physical, thermal, atomic, magnetic, or electrical properties. For instance, the third zone 312c may encompass regions of the bit body 108 that include the blades 102 (FIG. 1). Accordingly, it may prove advantageous to place a particular composition 318c in the third zone 312c to be infiltrated with a particular binder material 324c that produces a material that is highly erosion-resistant or hard. Moreover, it may prove advantageous to place a particular composition 318a in the first zone 312a to be infiltrated with a particular binder material 324a that produces a material that is highly ductile. Furthermore, it may prove advantageous to place a particular composition 318b in the second zone 312b, which may be adjacent the junk slots 124 (FIG. 1), to be infiltrated with a particular binder material 324b that produces a material that has favorable compressive residual stresses.

While only two boundary forms 1702a,b are depicted in FIG. 17, it will be appreciated that more than two may be employed, without departing from the scope of the disclosure. As will be appreciated, various boundary forms may be used and otherwise positioned in a generally horizontal or nested fashion, such that the bottom portion of a resulting MMC tool (e.g., a cutting region) is made using an erosion resistant material, and the material near the mandrel 202 may comprise a material that is tougher and/or more compatible with the material of the mandrel 202. Multiple horizontal or nested boundary forms may transition from the cutter region, which typically requires high erosion-resistance, to the bit-level region, which may be easily machinable. Accordingly, functionally-graded material may be produced to greatly increase the level of customization possible in different regions of a given MMC tool.

Embodiments disclosed herein include:

A. A method for fabricating an infiltrated metal-matrix composite (MMC) tool that includes positioning at least one boundary form within an infiltration chamber of a mold assembly and thereby segregating the infiltration chamber into at least a first zone and a second zone, depositing reinforcement materials into the infiltration chamber, the reinforcement materials including a first composition loaded into the first zone and a second composition loaded into the second zone, and infiltrating the first and second compositions with at least one binder material and thereby providing the infiltrated MMC tool with differing mechanical, chemical, physical, thermal, atomic, magnetic, or electrical properties between the first and second zones.

B. A method for fabricating an infiltrated metal-matrix composite (MMC) drill bit that includes positioning at least one boundary form within an infiltration chamber of a mold assembly and thereby segregating the infiltration chamber into at least a first zone and a second zone, wherein the mold assembly includes a mold and a funnel operatively coupled to the mold and defines a plurality of blade cavities, depositing reinforcement materials into the infiltration chamber, the reinforcement materials including a first composition loaded into the first zone and a second composition loaded into the second zone, and infiltrating the first and second compositions with at least one binder material and thereby providing the infiltrated MMC tool with differing mechanical, chemical, physical, thermal, atomic, magnetic, or electrical properties between the first and second zones.

Each of embodiments A and B may have one or more of the following additional elements in any combination: Element 1: wherein the first zone is located central to the infiltration chamber, and the second zone is separated from the first zone by the at least one boundary form and located adjacent the inner wall of the infiltration chamber, and wherein depositing reinforcement materials into the infiltration chamber comprises depositing the second composition into the second zone prior to depositing the first composition into the first zone. Element 2: wherein depositing reinforcement materials into the infiltration chamber comprises depositing the first and second compositions into the first and second zones, respectively, simultaneously. Element 3: wherein depositing reinforcement materials into the infiltration chamber comprises compacting the reinforcement materials at a first location in the infiltration chamber to a higher degree as compared to a second location in the infiltration chamber. Element 4: wherein the at least one boundary form includes a body and one or more ribs that extend from the body toward an inner wall of the infiltration chamber, and wherein positioning the at least one boundary form within the infiltration chamber comprises engaging the inner wall of the infiltration chamber with the one or more ribs, and providing an offset spacing between the body and the inner wall of the infiltration chamber with the one or more ribs, wherein the first zone is located central to the infiltration chamber, and the second zone is separated from the first zone by the at least one boundary form and located adjacent the inner wall of the infiltration chamber. Element 5: wherein positioning the at least one boundary form within the infiltration chamber comprises suspending the at least one boundary form within the infiltration chamber and thereby generating an offset spacing between the at least one boundary form and an inner wall of the infiltration chamber. Element 6: wherein the at least one boundary form comprises a material selected from the group consisting of copper, nickel, cobalt, iron, aluminum, molybdenum, chromium, manganese, tin, zinc, lead, silicon, tungsten, boron, phosphorous, gold, silver, palladium, indium, beryllium, hafnium, iridium, niobium, osmium, rhenium, rhodium, ruthenium, tantalum, vanadium, any mixture thereof, any alloy thereof, a superalloy, an intermetallic, a boride, a carbide, a nitride, an oxide, a ceramic, a diamond, a polymer, a foam, and any combination thereof. Element 7: wherein the at least one boundary form comprises an impermeable foil or plate, and wherein depositing the reinforcement materials into the infiltration chamber comprises preventing the first and second compositions from intermixing with the at least one boundary form. Element 8: wherein the at least one boundary form comprises a permeable mesh, grate, or plate, and wherein depositing the reinforcement materials into the infiltration chamber comprises intermixing at least a portion of the first and second compositions through the at least one boundary form. Element 9: wherein infiltrating the first and second compositions with the at least one binder material comprises penetrating the at least one boundary form with the at least one binder material and thereby infiltrating at least a portion of the first and second compositions on either side of the at least one boundary form. Element 10: wherein the at least one binder material comprises a first binder material and a second binder material, and wherein infiltrating the first and second compositions with the at least one binder material comprises infiltrating the first composition with the first binder material, and infiltrating the second composition with the second binder material. Element 11: wherein the at least one boundary form comprises a first boundary form and a second boundary form, the method further comprising positioning the first and second boundary forms within the infiltration chamber and thereby segregating the infiltration chamber into the first zone, the second zone, and a third zone, depositing a third composition of the reinforcement materials into the third zone, and infiltrating the first, second, and third compositions with the at least one binder material and thereby providing the infiltrated MMC tool with differing mechanical, chemical, physical, thermal, atomic, magnetic, or electrical properties between the first, second, and third zones. Element 12: further comprising dissolving at least a portion of the at least one boundary form into the at least one binder material as the at least one binder material infiltrates the first and second compositions.

Element 13: wherein the at least one binder material comprises a first binder material and a second binder material, and wherein the mold assembly further comprises an annular divider positioned within the infiltration chamber to separate the first and second binder materials, the method further comprising infiltrating the first composition with the first binder material, and infiltrating the second composition with the second binder material. Element 14: further comprising a binder bowl positioned on the funnel and including a first binder cavity that receives the first binder material and a second binder cavity that receives the second binder material, the method further comprising flowing the first binder material into the first zone during infiltration via one or more first conduits defined in the binder bowl and facilitating communication between the first binder cavity and the first zone, and flowing the second binder material into the second zone during infiltration via one or more second conduits defined in the binder bowl and facilitating communication between the second binder cavity and the second zone. Element 15: wherein the at least one binder material comprises a first binder material and a second binder material, and the funnel further defines a binder cavity and one or more conduits that facilitate communication between the binder cavity and the second zone, the method further comprising infiltrating the first composition in the first zone with the first binder material, and infiltrating the second composition in the second zone with the second binder material deposited in the binder cavity and flowing through the one or more conduits. Element 16: wherein depositing reinforcement materials into the infiltration chamber comprises compacting the reinforcement materials at the plurality of blade cavities to a higher degree as compared to other locations in the infiltration chamber. Element 17: wherein the at least one binder material comprises a first binder material and a second binder material, and wherein infiltrating the first and second compositions with the at least one binder material comprises infiltrating the first composition with the first binder material, and infiltrating the second composition with the second binder material. Element 18: wherein the at least one boundary form comprises one or more tubes and positioning the at least one boundary form within the infiltration chamber comprises positioning the one or more tubes within one or more of the plurality of blade cavities. Element 19: wherein the at least one boundary form comprises a first boundary form and a second boundary form, the method further comprising positioning the first and second boundary forms within the infiltration chamber and thereby segregating the infiltration chamber into the first zone, the second zone, and a third zone, depositing a third composition of the reinforcement materials into the third zone, and infiltrating the first, second, and third compositions with the at least one binder material and thereby providing the infiltrated MMC drill bit with differing mechanical, chemical, physical, thermal, atomic, magnetic, or electrical properties between the first, second, and third zones.

By way of non-limiting example, exemplary combinations applicable to A and B include: Element 8 with Element 9; and Element 13 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:
1. A method for fabricating an infiltrated metal-matrix composite (MMC) tool, comprising:

positioning at least one boundary form within an infiltration chamber of a mold assembly and thereby segregating the infiltration chamber into at least a first zone and a second zone;

depositing reinforcement materials into the infiltration chamber, the reinforcement materials including a first composition loaded into the first zone and a second composition loaded into the second zone; and after positioning the at least one boundary form within the infiltration chamber, infiltrating the first and second compositions with at least one binder material, and thereby providing the infiltrated MMC tool with differing mechanical, chemical, physical, thermal, atomic, magnetic, or electrical properties between the first and second zones.

2. The method of claim 1, wherein the first zone is located central to the infiltration chamber, and the second zone is separated from the first zone by the at least one boundary form and located adjacent the inner wall of the infiltration chamber, and wherein depositing reinforcement materials into the infiltration chamber comprises depositing the second composition into the second zone prior to depositing the first composition into the first zone.

3. The method of claim 1, wherein depositing reinforcement materials into the infiltration chamber comprises depositing the first and second compositions into the first and second zones, respectively, simultaneously.

4. The method of claim 1, wherein depositing reinforcement materials into the infiltration chamber comprises compacting the reinforcement materials at a first location in the infiltration chamber to a higher degree as compared to a second location in the infiltration chamber.

5. The method of claim 1, wherein the at least one boundary form includes a body and one or more ribs that extend from the body toward an inner wall of the infiltration chamber, and wherein positioning the at least one boundary form within the infiltration chamber comprises:

engaging the inner wall of the infiltration chamber with the one or more ribs; and providing an offset spacing between the body and the inner wall of the infiltration chamber with the one or more ribs, wherein the first zone is located central to the infiltration chamber, and the second zone is separated from the first zone by the at least one boundary form and located adjacent the inner wall of the infiltration chamber.

6. The method of claim 1, wherein positioning the at least one boundary form within the infiltration chamber comprises suspending the at least one boundary form within the infiltration chamber and thereby generating an offset spacing between the at least one boundary form and an inner wall of the infiltration chamber.

7. The method of claim 1, wherein the at least one boundary form comprises a material selected from the group consisting of copper, nickel, cobalt, iron, aluminum, molybdenum, chromium, manganese, tin, zinc, lead, silicon, tungsten, boron, phosphorous, gold, silver, palladium, indium, beryllium, hafnium, iridium, niobium, osmium, rhenium, rhodium, ruthenium, tantalum, vanadium, any mixture thereof, any alloy thereof, a superalloy, an intermetallic, a boride, a carbide, a nitride, an oxide, a ceramic, a diamond, a polymer, a foam, and any combination thereof.

8. The method of claim 1, wherein the at least one boundary form comprises an impermeable foil or plate, and wherein depositing the reinforcement materials into the infiltration chamber comprises preventing the first and second compositions from intermixing with the at least one boundary form.

9. The method of claim 1, wherein the at least one boundary form comprises a permeable mesh, grate, or plate, and wherein depositing the reinforcement materials into the infiltration chamber comprises intermixing at least a portion of the first and second compositions through the at least one boundary form.

10. The method of claim 9, wherein infiltrating the first and second compositions with the at least one binder material comprises penetrating the at least one boundary form with the at least one binder material and thereby infiltrating at least a portion of the first and second compositions on either side of the at least one boundary form.

11. The method of claim 1, wherein the at least one binder material comprises a first binder material and a second binder material, and wherein infiltrating the first and second compositions with the at least one binder material comprises:
   infiltrating the first composition with the first binder material; and
   infiltrating the second composition with the second binder material.

12. The method of claim 1, wherein the at least one boundary form comprises a first boundary form and a second boundary form, the method further comprising:
   positioning the first and second boundary forms within the infiltration chamber and thereby segregating the infiltration chamber into the first zone, the second zone, and a third zone;
   depositing a third composition of the reinforcement materials into the third zone; and
   infiltrating the first, second, and third compositions with the at least one binder material and thereby providing the infiltrated MMC tool with differing mechanical, chemical, physical, thermal, atomic, magnetic, or electrical properties between the first, second, and third zones.

13. The method of claim 1, further comprising dissolving at least a portion of the at least one boundary form into the at least one binder material as the at least one binder material infiltrates the first and second compositions.

14. A method for fabricating an infiltrated metal-matrix composite (MMC) drill bit, comprising:
   positioning at least one boundary form within an infiltration chamber of a mold assembly and thereby segregating the infiltration chamber into at least a first zone and a second zone, wherein the mold assembly includes a mold and a funnel operatively coupled to the mold and defines a plurality of blade cavities;
   depositing reinforcement materials into the infiltration chamber, the reinforcement materials including a first composition loaded into the first zone and a second composition loaded into the second zone; and
   after positioning the at least one boundary form within the infiltration chamber, infiltrating the first and second compositions with at least one binder material, and thereby providing the infiltrated MMC tool with differing mechanical, chemical, physical, thermal, atomic, magnetic, or electrical properties between the first and second zones.

15. The method of claim 14, wherein the at least one binder material comprises a first binder material and a second binder material, and wherein the mold assembly further comprises an annular divider positioned within the infiltration chamber to separate the first and second binder materials, the method further comprising:
   infiltrating the first composition with the first binder material; and
   infiltrating the second composition with the second binder material.

16. The method of claim 15, further comprising a binder bowl positioned on the funnel and including a first binder cavity that receives the first binder material and a second binder cavity that receives the second binder material, the method further comprising:
   flowing the first binder material into the first zone during infiltration via one or more first conduits defined in the binder bowl and facilitating communication between the first binder cavity and the first zone; and
   flowing the second binder material into the second zone during infiltration via one or more second conduits defined in the binder bowl and facilitating communication between the second binder cavity and the second zone.

17. The method of claim 14, wherein the at least one binder material comprises a first binder material and a second binder material, and the funnel further defines a binder cavity and one or more conduits that facilitate communication between the binder cavity and the second zone, the method further comprising:
   infiltrating the first composition in the first zone with the first binder material; and
   infiltrating the second composition in the second zone with the second binder material deposited in the binder cavity and flowing through the one or more conduits.

18. The method of claim 14, wherein depositing reinforcement materials into the infiltration chamber comprises compacting the reinforcement materials at the plurality of blade cavities to a higher degree as compared to other locations in the infiltration chamber.

19. The method of claim 14, wherein the at least one binder material comprises a first binder material and a second binder material, and wherein infiltrating the first and second compositions with the at least one binder material comprises:
   infiltrating the first composition with the first binder material; and
   infiltrating the second composition with the second binder material.

20. The method of claim 14, wherein the at least one boundary form comprises one or more tubes and positioning the at least one boundary form within the infiltration chamber comprises positioning the one or more tubes within one or more of the plurality of blade cavities.

21. The method of claim 14, wherein the at least one boundary form comprises a first boundary form and a second boundary form, the method further comprising:
   positioning the first and second boundary forms within the infiltration chamber and thereby segregating the infiltration chamber into the first zone, the second zone, and a third zone;
   depositing a third composition of the reinforcement materials into the third zone; and
   infiltrating the first, second, and third compositions with the at least one binder material and thereby providing the infiltrated MMC drill bit with differing mechanical, chemical, physical, thermal, atomic, magnetic, or electrical properties between the first, second, and third zones.

* * * * *